United States Patent
Yajima et al.

(10) Patent No.: US 7,377,503 B2
(45) Date of Patent: May 27, 2008

(54) CLAMP DEVICE

(75) Inventors: Masatoshi Yajima, Yokohama (JP); Shouhei Imai, Kanagawa (JP); Norio Kawano, Yokohama (JP); Masamichi Miwa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 102 days.

(21) Appl. No.: 11/085,050

(22) Filed: Mar. 22, 2005

(65) Prior Publication Data

US 2005/0218576 A1    Oct. 6, 2005

(30) Foreign Application Priority Data

Mar. 31, 2004    (JP)    ............... 2004-106783

(51) Int. Cl.
*B25B 1/00* (2006.01)
(52) U.S. Cl. .................. 269/152; 269/32; 29/281.1
(58) Field of Classification Search ............... 269/152, 269/156, 43, 155, 32, 20; 29/281.1
See application file for complete search history.

(56) References Cited

U.S. PATENT DOCUMENTS

| | | | | |
|---|---|---|---|---|
| 2,472,083 A | * | 6/1949 | Bartholdy | ............ 269/82 |
| 4,998,712 A | * | 3/1991 | Park et al. | ............ 269/25 |
| 5,536,915 A | | 7/1996 | Peru et al. | |
| 5,605,275 A | | 2/1997 | Rintala | |
| 5,816,568 A | * | 10/1998 | Fox | ............ 269/60 |
| 5,901,426 A | | 5/1999 | Okazaki et al. | |
| 6,080,961 A | | 6/2000 | Suzuki | |
| 6,575,444 B1 | * | 6/2003 | Bidaud | ............ 269/91 |
| 2005/0218576 A1 | * | 10/2005 | Yajima et al. | ............ 269/32 |

FOREIGN PATENT DOCUMENTS

| | | |
|---|---|---|
| GB | 2 388 566 A | 11/2003 |
| JP | 7-290162 A | 11/1995 |
| JP | 9-019722 A | 1/1997 |
| JP | 10-015688 A | 1/1998 |
| JP | 10-180470 A | 7/1998 |
| JP | 11-104750 A | 4/1999 |
| JP | 11-320168 A | 11/1999 |
| JP | 2001-287090 A | 10/2001 |
| JP | 2003-19516 A | 1/2003 |
| KR | 1998-033386 A | 7/1998 |

* cited by examiner

*Primary Examiner*—Lee D Wilson
(74) *Attorney, Agent, or Firm*—Foley & Lardner LLP

(57) ABSTRACT

The disclosed clamp device for clamping blank pieces may comprise a mounting table, first and second clamping units, positioning units, and lock units. The mounting table is for placing thereon first and second blank pieces. The first and second clamping units have respective clamp plates that are able to be put on the first and second blank pieces while permitting a guided movement of the first and second blank pieces on the mounting table. The positioning units move the first and second blank pieces to establish a positioning of the first and second blank pieces on the mounting table. The lock units apply a given force to the first and second clamp plates to lock the first and second blank pieces.

10 Claims, 25 Drawing Sheets

FIG.3
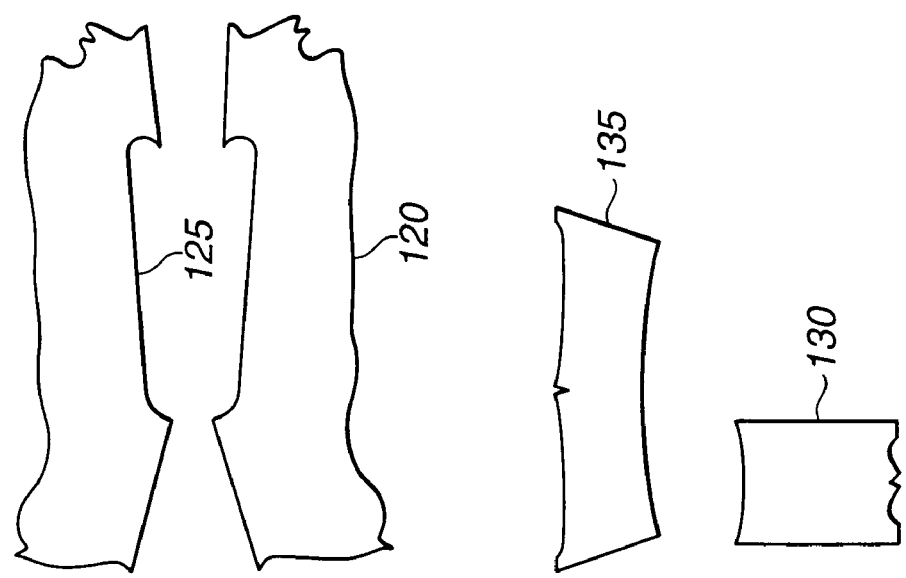
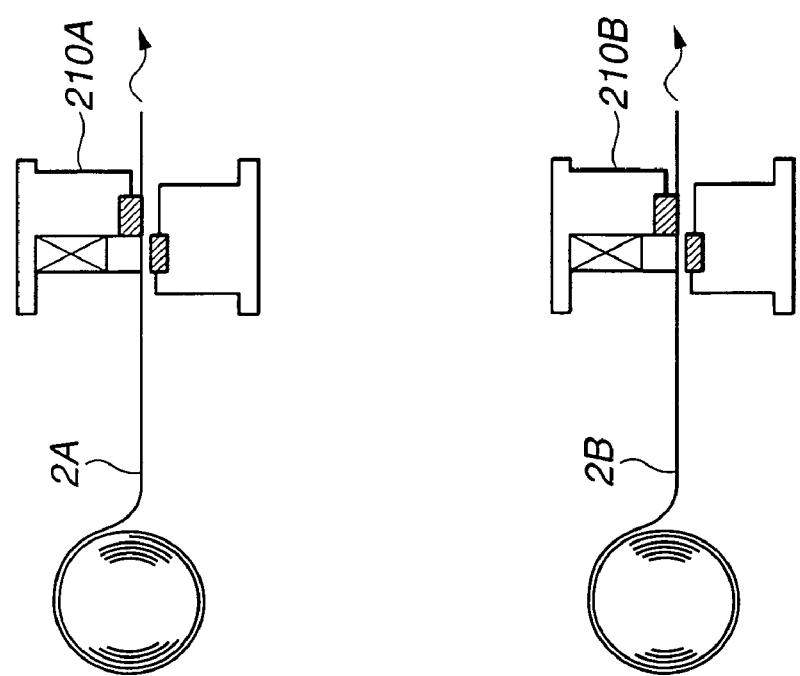

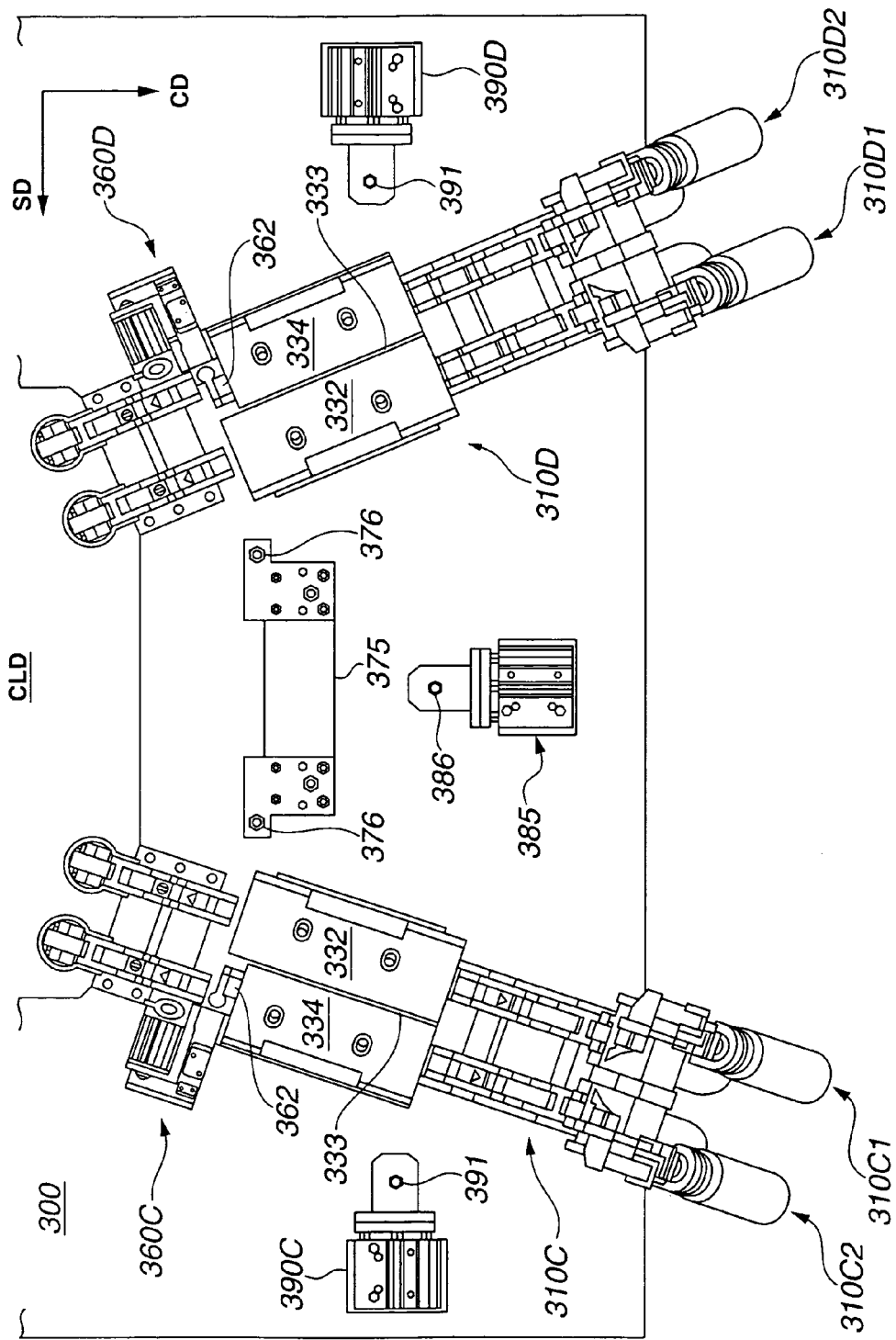

CLD

CLD

CLD

CLD

CLD

CLD

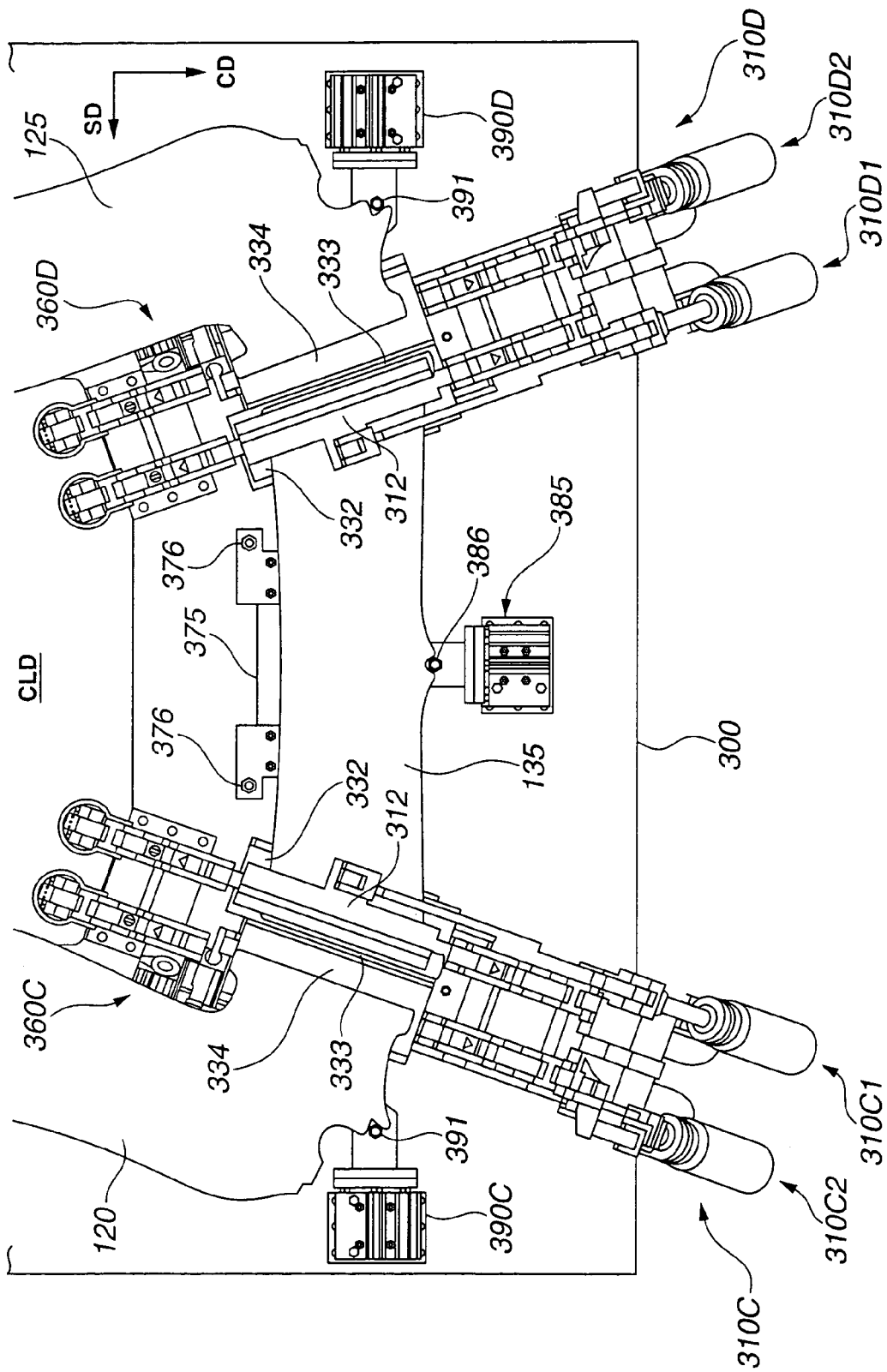

CLD

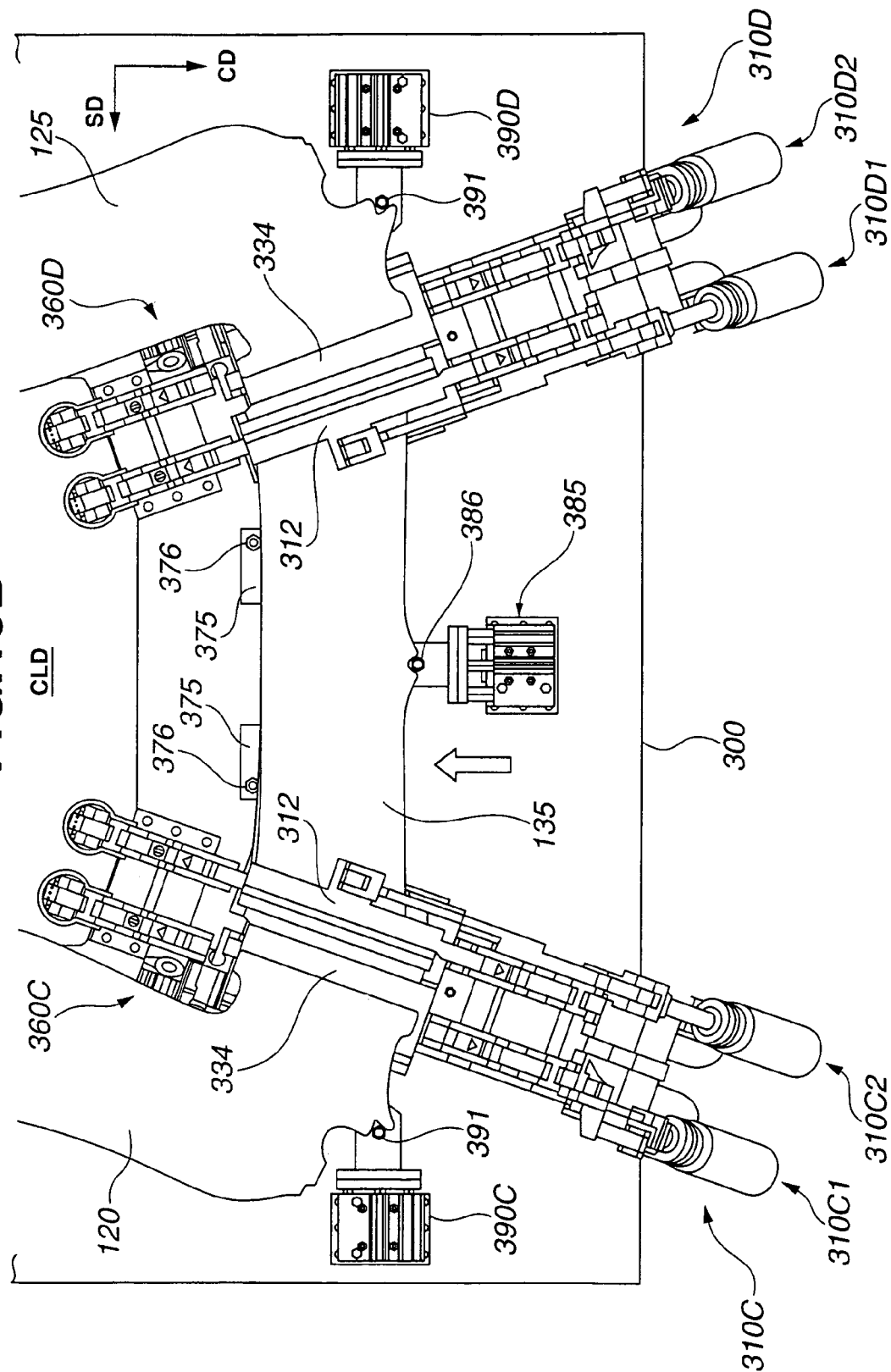

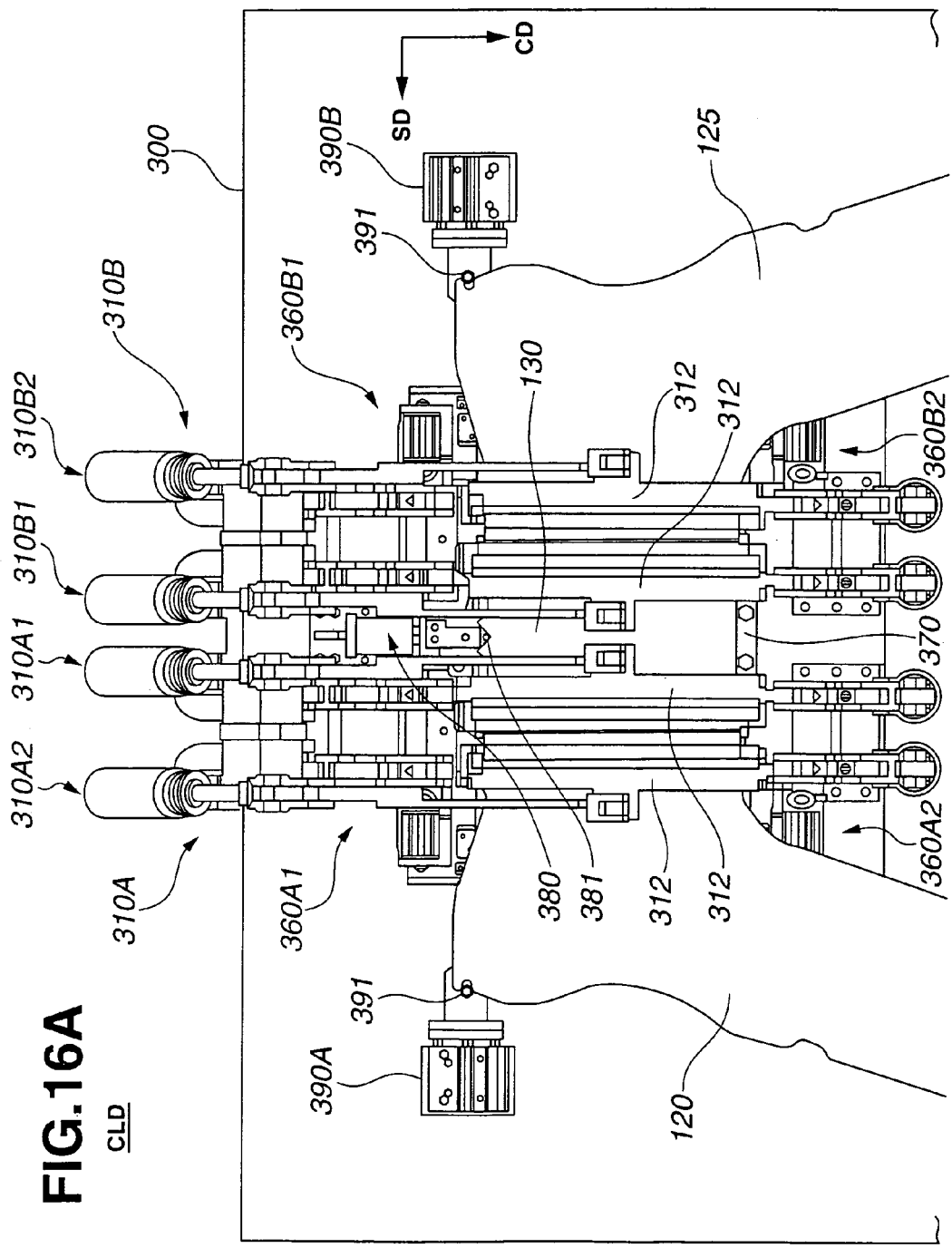

CLD

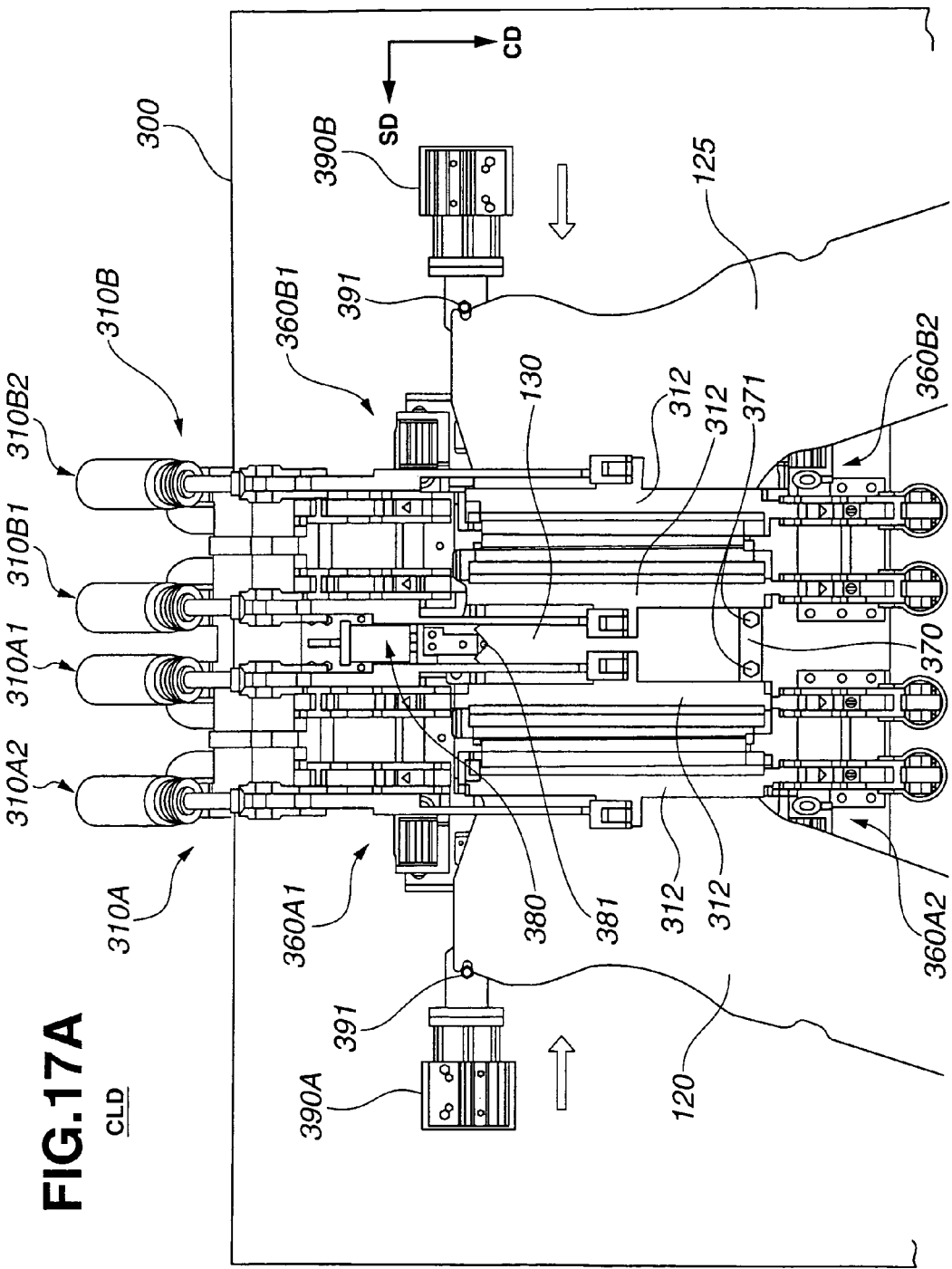

CLAMP DEVICE

BACKGROUND OF THE INVENTION

1. Field of the Invention

The present invention relates in general to clamp devices that clamp work pieces together, and more particularly to clamp devices of a type that clamps different types of blank pieces together for welding them to produce a tailored blank sheet. More specifically, the present invention is concerned with the clamp devices of a type that clamps a plurality of blank pieces in such a manner that every adjacent two of the blank pieces contact to each other at respective given edges thereof, in order to join thereafter the blank pieces together by applying a welding to the mutually contacting edges.

2. Description of the Related Art

Recently, particularly in the field of metal materials for wheeled motor vehicles, tailored blank sheets have been widely used, which are to be pressed to produce various parts of the motor vehicles. As is known, the tailored blank sheet is manufactured by welding different blank pieces at their mutually contacting edges. Actually, the different blank pieces are different in size, shape, thickness, strength, etc. The tailored blank sheet is ideal for the material for motor vehicle parts because of its wide applicability for the needs that the parts have, such as, reduction in weight and cost while keeping a satisfied mechanical strength of given portions. Some of such tailored blank sheets are shown in Japanese Laid-open Patent Applications (Tokkaihei) 10-180470, 11-104750 and (Tokkai) 2003-19516.

SUMMARY OF THE INVENTION

Hitherto, in the field of manufacturing the tailored blank sheets, various clamp devices have been proposed and put into practical use, which clamp different blank pieces together before welding the same at their mutually contacting edges. However, some of the known clamp devices have failed to exhibit a satisfied clamping function due to their inherent construction. That is, in such clamp devices, putting the different blank pieces onto a mounting table, moving these different blank pieces to respective proper positions on the mounting table and locking these different blank pieces at their proper positions have not been easily carried out. Actually, in such known clamp devices, these three operation steps, viz., the step for putting the blank pieces onto the mounting table, the step for moving the blank pieces to the respective positions and the step for locking the positioned blank pieces, are carried out in an unsystematic way needing futile interval steps. This reduces the productivity of product, viz., the tailored blank sheet and thus increases the cost of the same.

It is therefore an object of the present invention to provide a clamp device which is free of the above-mentioned drawbacks.

According to the present invention, there is provided a clamp device by which a step for putting different blank pieces onto a mounting table, a step for moving the blank pieces to respective proper positions on the mounting table and a step for locking the positioned flank pieces are carried out in a systematic way.

In accordance with a first aspect of the present invention, there is provided a clamp device for clamping different blank pieces, which comprises a mounting table having first and second mounting surfaces for placing thereon first and second ones of the different blank pieces respectively; a first clamping unit having a clamp plate that is able to be put on the first blank piece while permitting a guided movement of the first blank piece on the first mounting surface; a first positioning unit that moves the first blank piece in a first direction to establish a positioning of the first blank piece in the first direction; a second positioning unit that moves the first blank piece in a second direction to establish a positioning of the first blank piece in the second direction; a first lock unit that applies a given force to the clamp plate of the first clamping unit thereby to lock the first blank piece that has been positioned in the first and second directions; a second clamping unit having a clamp plate that is able to be put on the second blank piece while permitting a guided movement of the second blank piece on the second mounting surface; a third positioning unit that moves the second blank piece to a position where a given edge of the second blank piece is in contact with a given edge of the first blank piece that has been locked; and a second lock unit that applies a given force to the clamp plate of the second clamping unit thereby to lock the second blank piece that has been positioned by the third positioning unit.

In accordance with a second aspect of the present invention, there is provided a clamp device for clamping at least first and second blank pieces, which comprises a mounting table for placing thereon the first and second blank pieces; first and second clamping units having respective clamp plates that are able to be put on the first and second blank pieces while permitting a guided movement of the first and second blank pieces on the mounting table; positioning units that move the first and second blank pieces to establish a positioning of the first and second blank pieces on the mounting table; and lock units that apply a given force to the first and second clamp plates to lock the first and second blank pieces that have been positioned.

In accordance with a third aspect of the present invention, there is provided a method of clamping different blank pieces, which comprises placing first and second ones of the different blank pieces on first and second mounting surfaces respectively; putting a first clamp plate onto the first blank piece while permitting a guided movement of the first blank piece on the first mounting surface; moving the first blank piece in a first direction to establish a positioning of the first blank piece in the first direction; moving the first blank piece in a second direction to establish a positioning of the first blank piece in the second direction; applying a given force to the first clamp plate to lock the first blank piece that has been positioned in the first and second directions; putting a second clamp plate onto the second blank piece while permitting a guided movement of the second blank piece on the second mounting surface; moving the second blank place to a position where a given a given edge of the second blank piece is in contact with a give edge of the first blank piece that has been locked; and applying a given force to the second clamp plate to lock the second blank piece that has been positioned.

BRIEF DESCRIPTION OF THE DRAWINGS

FIG. 3 is a conceptional view showing a step for blanking or stamping out four types of blank pieces from two coiled metal sheets by using two blanking machines, which are to be joined together to form the tailored blank sheet of FIG. 2;

FIG. 4B is a plan view of a lower half area of the clamp device of the present invention, where other two clamp units are arranged, each including inside and outside clamping units;

FIGS. 14A and 14B are views similar to FIGS. 13A and 13B, but showing a condition wherein the clamp plates for the upper and lower thinner blank pieces are put on these thinner blank pieces;

FIGS. 15A and 15B are views similar to FIGS. 14A and 14B, but showing a condition wherein the upper and lower thinner blank pieces are moved to be positioned with respect to the corresponding mounting tables;

FIGS. 16A and 16B are views similar to FIGS. 15A and 15B, but showing a condition wherein also the clamp plates for the left and right thicker blank pieces are put on these thicker blank pieces;

FIGS. 17A and 17B are views similar to FIGS. 16A and 16B, but showing a condition wherein the left and right thicker blank pieces are moved to be positioned with respect to the upper and lower thinner blank pieces that have been locked;

DETAILED DESCRIPTION OF THE INVENTION

In the following, a clamp device "CLD" of the present invention will be described in detail with reference to the accompanying drawings.

For ease of understanding, various directional terms, such as, right, left, upper, lower, rightward and the like will be used in the following description. However, such terms are to be understood with respect to only drawing or drawings on which corresponding part or portion is shown.

As will become apparent as the description proceeds, the clamp device "CLD" according to the present invention is constructed to clamp four different blank pieces that are to be joined together to produce a tailored blank sheet that is to be pressed to produce a suspension part 10.

Figure 1:
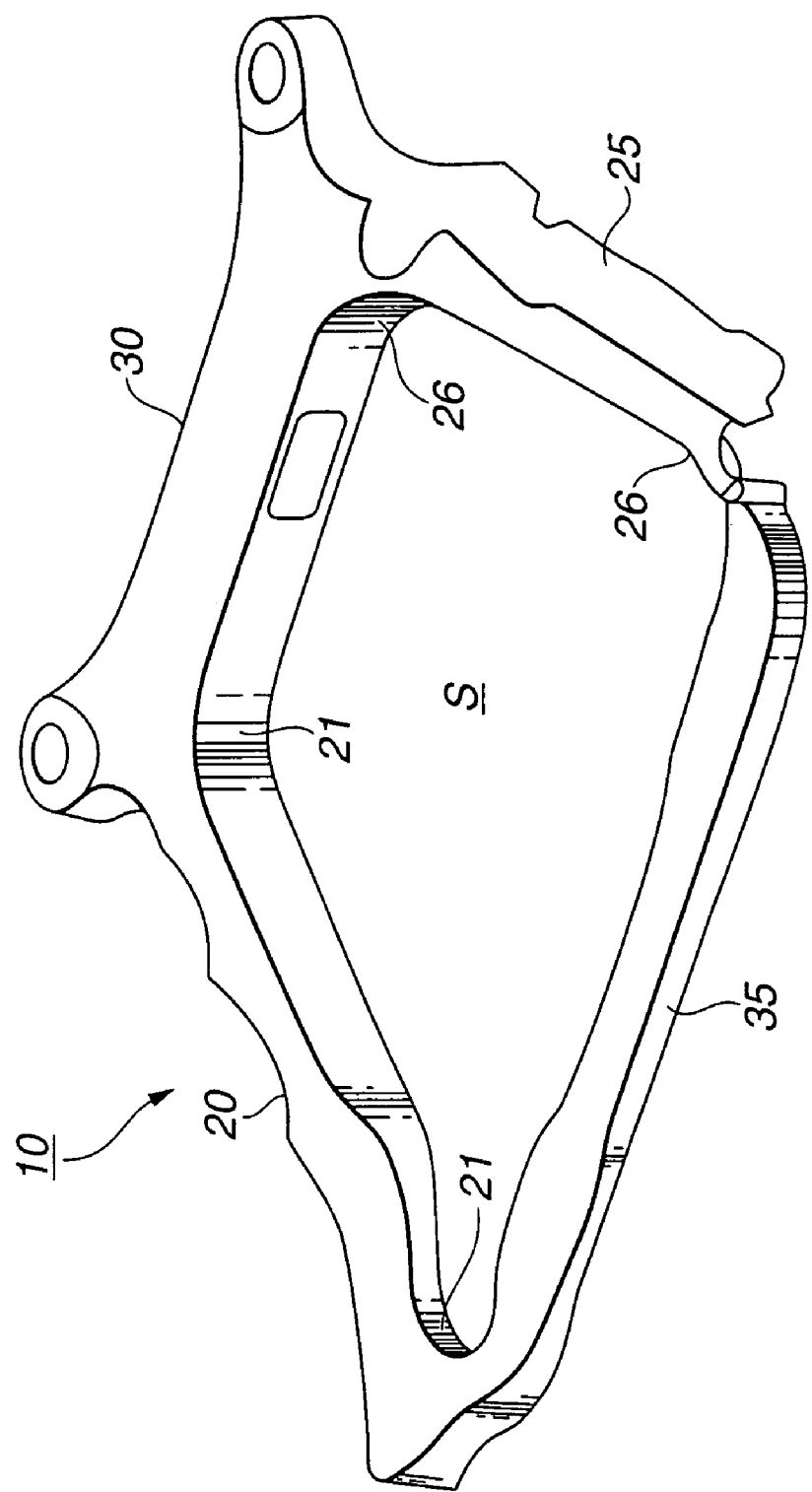
FIG. 1 is a perspective view of a suspension part of a motor vehicle, that is a tailored blank article produced by pressing a tailored blank sheet.
Figure 2:
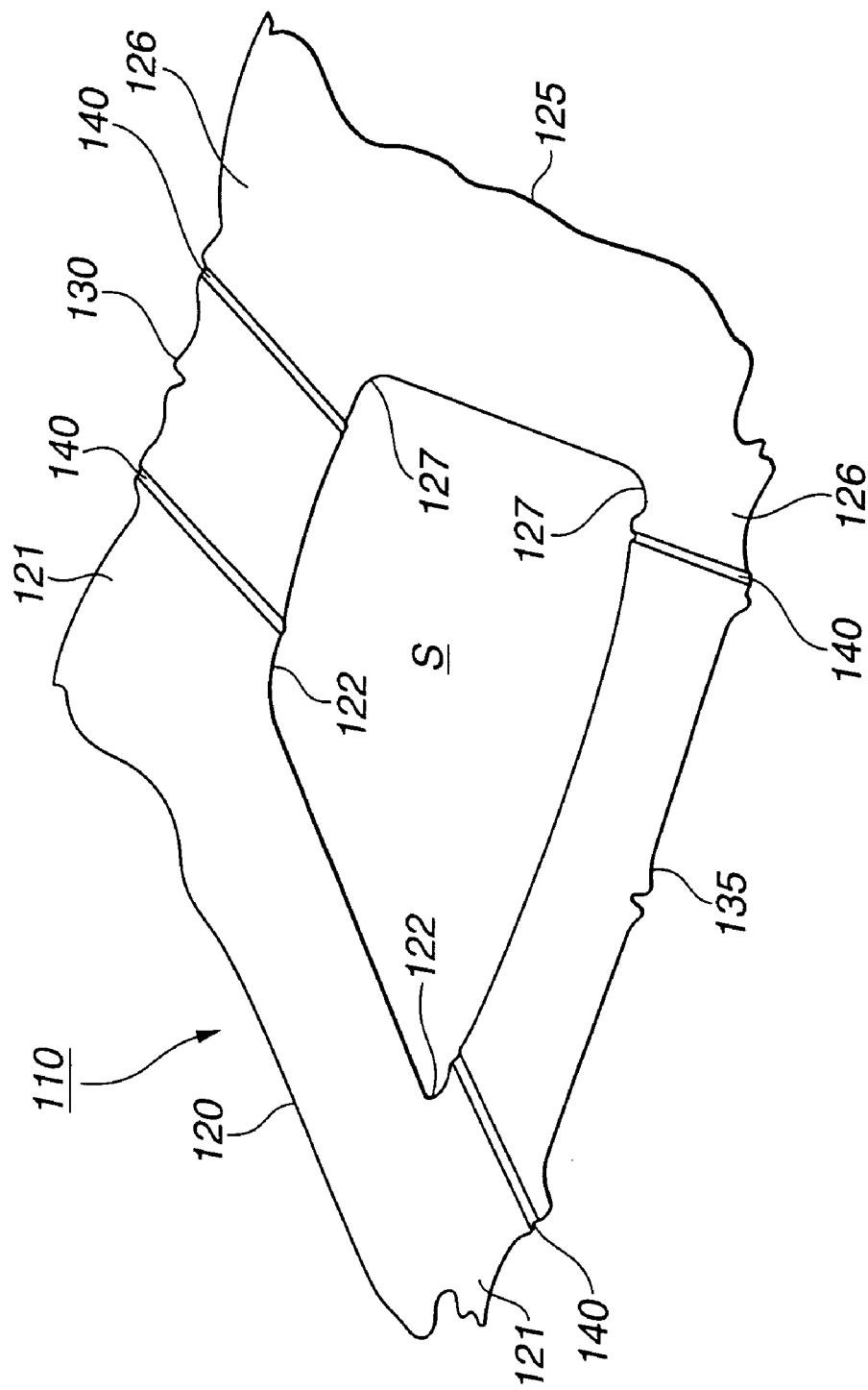
FIG. 2 is a perspective view of the tailored blank sheet that is to be pressed to produce the suspension part of FIG. 1.

Referring to FIG. 1, there is shown the suspension part 10 for a motor vehicle, that is produced by pressing a tailored blank sheet 110 that is shown in FIG. 2. An aluminum alloy sheet, a steel sheet and the like can be used as materials for the blank pieces for suspension part 10.

As is seen from FIG. 1, suspension part 10 shown comprises left and right side members 20 and 25 and upper and lower cross members 30 and 35.

As shown, these four members 20, 25, 30 and 35 are the different blank pieces, each being blanked or stamped out from a metal sheet (see FIG. 3). These four members 20, 25, 30 and 35 are integrally jointed together to constitute a generally trapezoidal frame like construction having a trapezoidal space "S" defined therein. Suspension part 10 has at its inner surface four rounded corners 21, 21, 26 and 26.

Referring to FIG. 2, there is shown the tailored blank sheet 110 that is to be pressed for producing the suspension part 10 of FIG. 1.

Tailored blank sheet 110 shown in FIG. 2 comprises left and right thicker blank pieces 120 and 125 that correspond to the above-mentioned left and right side members 20 and 25 of FIG. 1, upper and lower thinner blank pieces 130 and 135 that correspond to the above-mentioned upper and lower cross members 30 and 36 of FIG. 1, and four welded portions 140 that tightly connect, by welding, mutually contacting edges of every neighboring two of thicker and thinner blank pieces 120, 125, 130 and 135. As shown, tailored blank sheet 110 has a generally trapezoidal shape and has a trapezoidal space "S" defined therein. Tailored blank sheet 110 has at its inner periphery four bent portions 122, 122, 127 and 127, and tailored blank sheet 110 has four corner portions 121, 121, 126 and 126. It is to be noted that upon pressing of tailored blank sheet 110, the inner bent portions 122, 122, 127 and 127 are formed into the above-mentioned four rounded corners 21, 21, 26 and 26 of suspension part 10 of FIG. 1.

Referring to FIG. 3, there is schematically shown a method of producing left and right thicker and upper and lower thinner blank pieces 120, 125, 130 and 130. As shown, left and right thicker blank pieces 120 and 125 are blanked or stamped out from a thicker metal sheet 2A by using a blanking machine 210A, while upper and lower thinner blank pieces 130 and 135 are blanked or stamped out from a thinner metal sheet 2B by using another blanking machine 210B. For the reason that will be explained hereinlater, only three types of cutting dies are used for producing the four types of blank pieces 120, 125, 130 and 135.

These four different blank pieces 120, 125, 130 and 135 are tightly clamped by the clamp device "CLD" of the present invention to assume their proper locked positions respectively for preparation of a subsequent welding process. That is, by the clamp device "CLD" of the invention, four different blank pieces 120, 125, 130 and 135 are stably placed or clamped on four mounting tables 331 in such an arrangement as shown by FIG. 2.

Figure 4A:
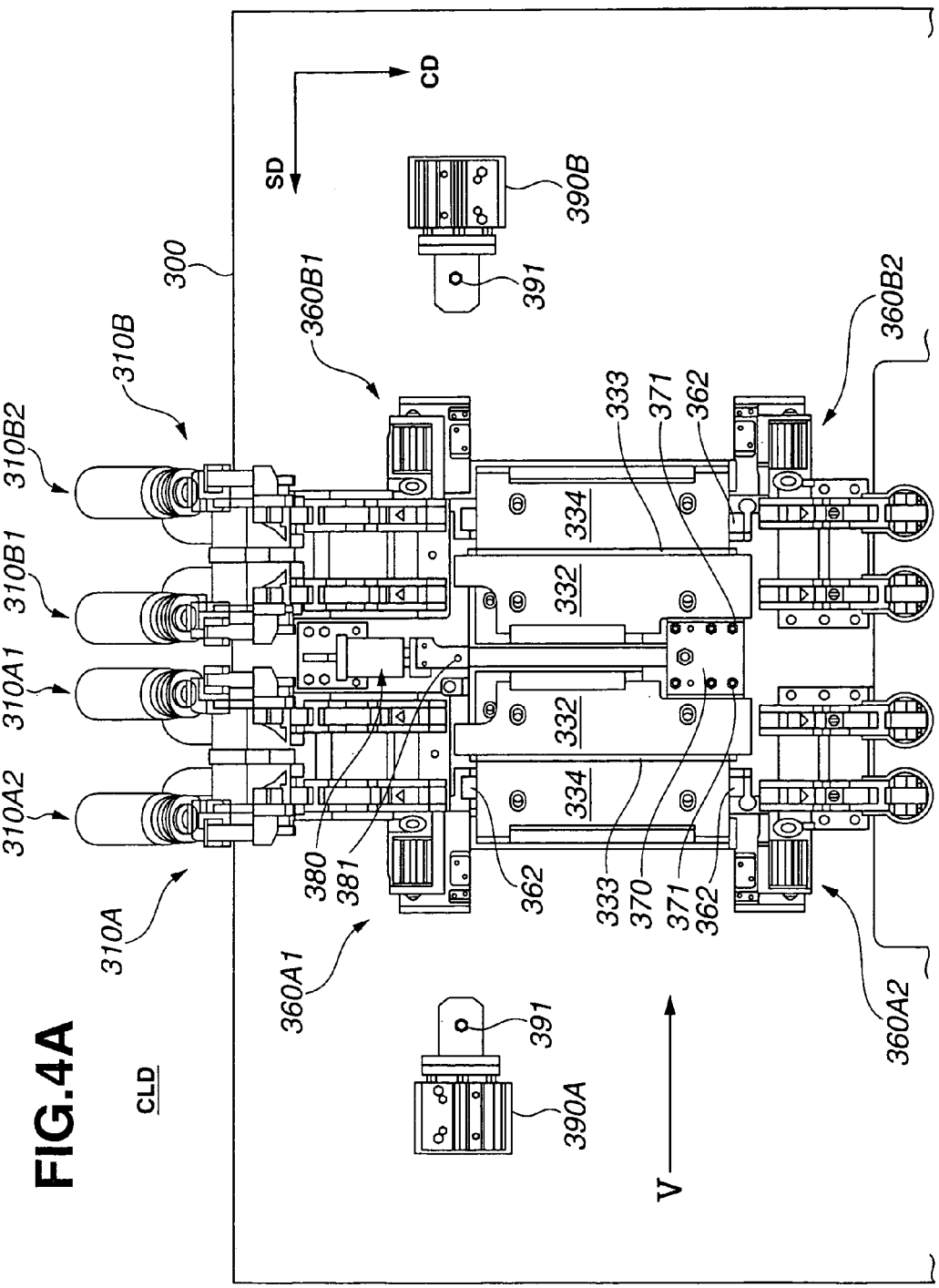
FIG. 4A is a plan view of an upper half area of a clamp device according to the present invention, where two clamp units are arranged, each including inside and outside clamping units.

Referring to FIGS. 4A and 4B, there is shown, in a plan view, the clamp device "CLD" according to the present invention. It is to be noted that FIG. 4A shows an upper area of clamp device "CLD" where upper thinner blank piece 130 (see FIG. 2) and its associated portions of left and right thicker blank pieces 120 and 125 are clamped, and FIG. 4B shows a lower area of clamp device "CLD" where lower thinner blank piece 135 (see FIG. 2) and its associated portions of left and right thicker blank pieces 120 and 125 are clamped.

As is seen from FIGS. 4A and 4B, clamp device "CLD" of the present invention generally comprises a tool base 300, four clamp units 310A, 310B, 310C and 310D that are mounted on tool base 300, and twelve positioning units 360A1, 360A2, 360B1, 360B2, 360C, 360D, 380, 385, 390A, 390B, 390C, 390D that are also mounted on tool base 300.

Figure 13A:
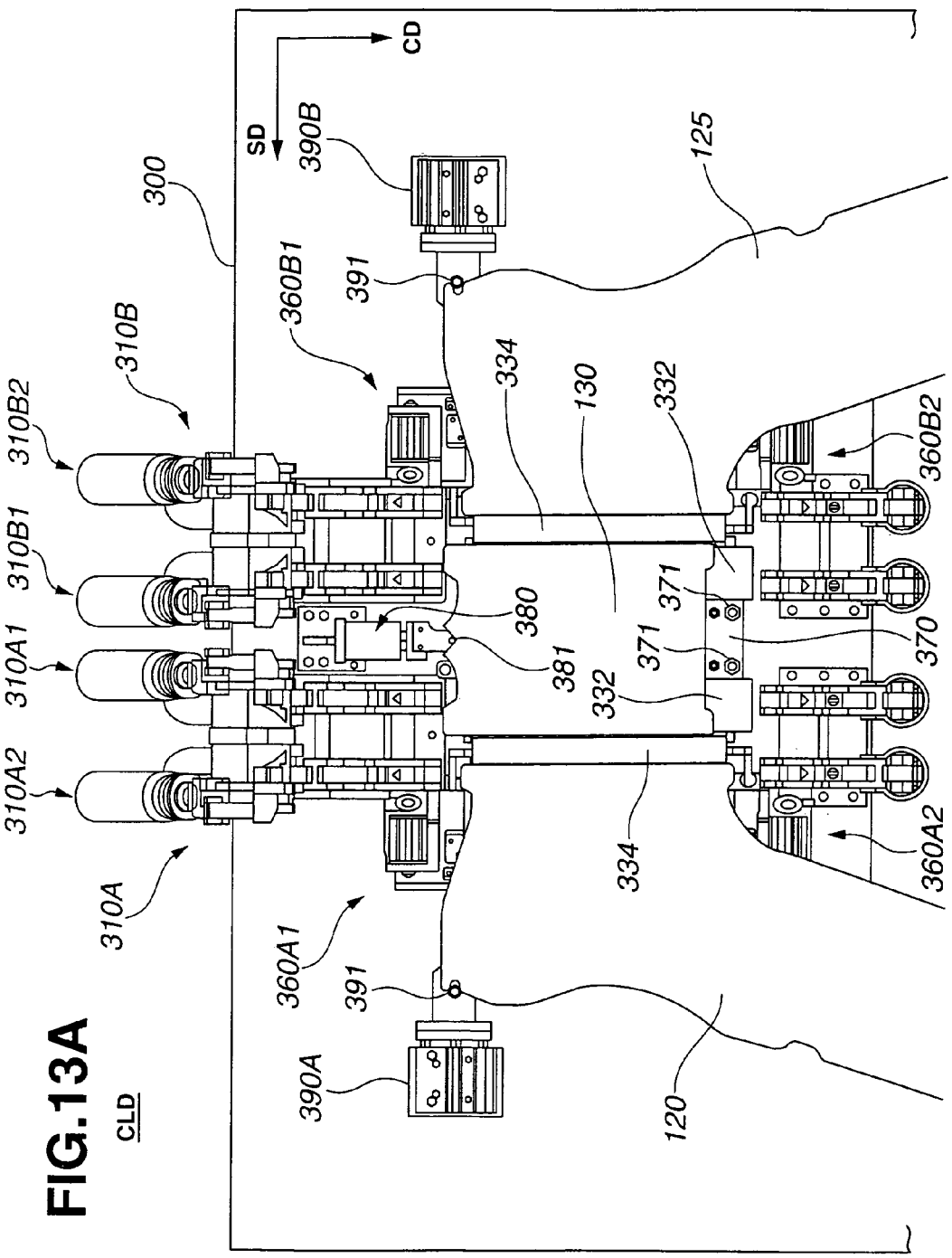
FIGS. 13A and 13B are views similar to FIGS. 4A and 4B, but showing a condition wherein four different blank pieces (viz., left and right thicker blank pieces and upper and lower thinner blank pieces) are put on the four mounting tables and all of the clamp plates are opened or raised.

As is understood from FIGS. 4A and 13A, clamp unit 310A includes inside and outside identical clamping units 310A1 and 310A2, the inside unit 310A1 being arranged to clamp a left part of upper thinner blank piece 130 and the outside unit 310A2 being arranged to clamp an upper part of left thicker blank piece 120. Clamp unit 310B includes inside and outside identical clamping units 310B1 and 310B2, the inside unit 310B1 being arranged to clamp a right part of upper thinner blank piece 130 and the outside unit 310B2 being arranged to clamp an upper part of right thicker blank piece 125.

Figure 13B:
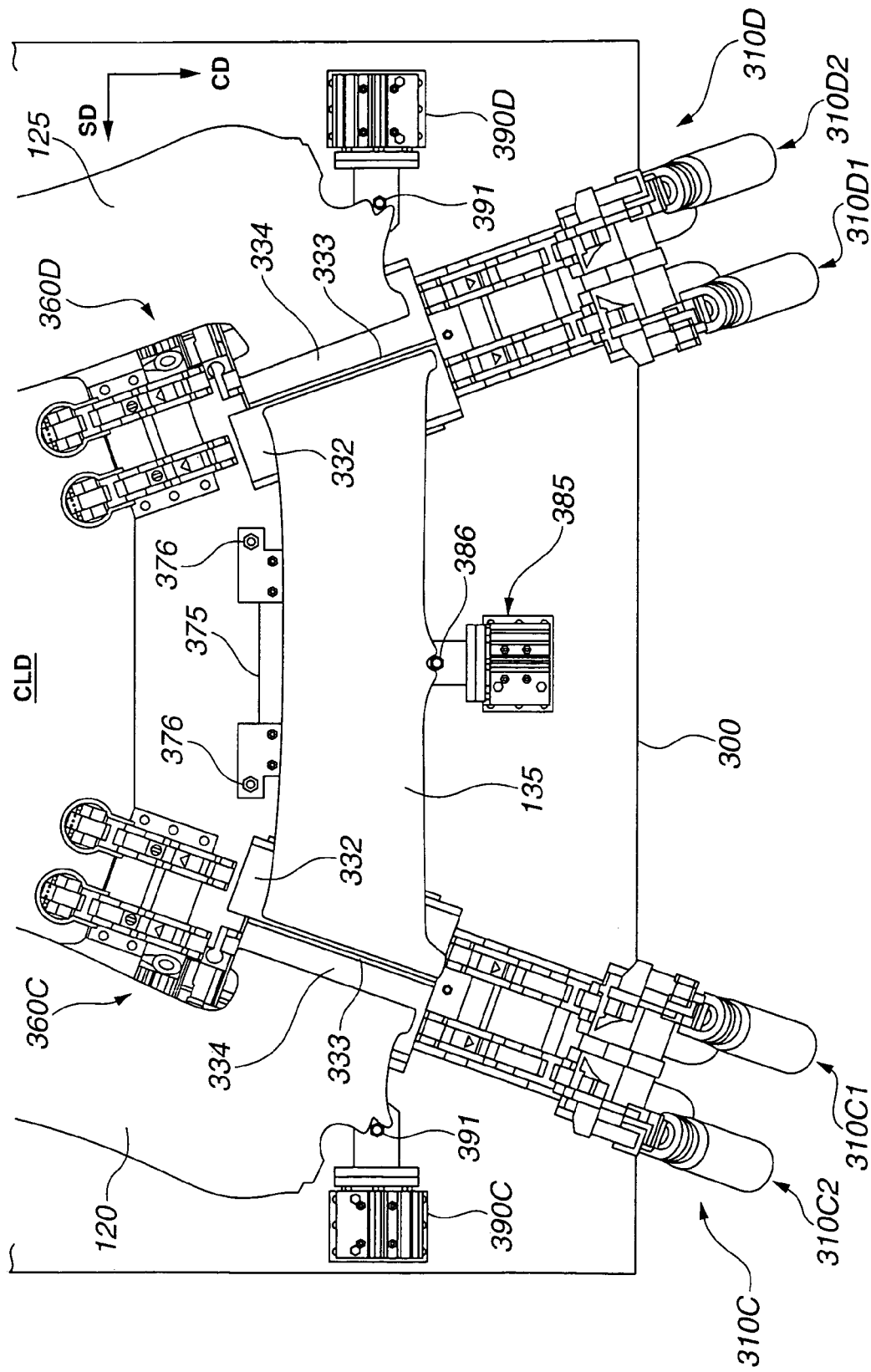

While, as will be understood from FIGS. 4B and 13B, clamp unit 310C includes inside and outside identical clamping units 310C1 and 310C2, the inside unit 310C1 being arranged to clamp a left part of lower thinner blank piece 135 and the outside unit 310C2 being arranged to clamp a lower part of left thicker blank piece 120. Clamp unit 310D includes inside and outside identical clamping units 310D1 and 310D2, the inside unit 310D1 being arranged to clamp a right part of lower thinner blank piece 135 and the outside unit 310D2 being arranged to clamp a lower part of right thicker blank piece 125, as shown.

Figure 17B:
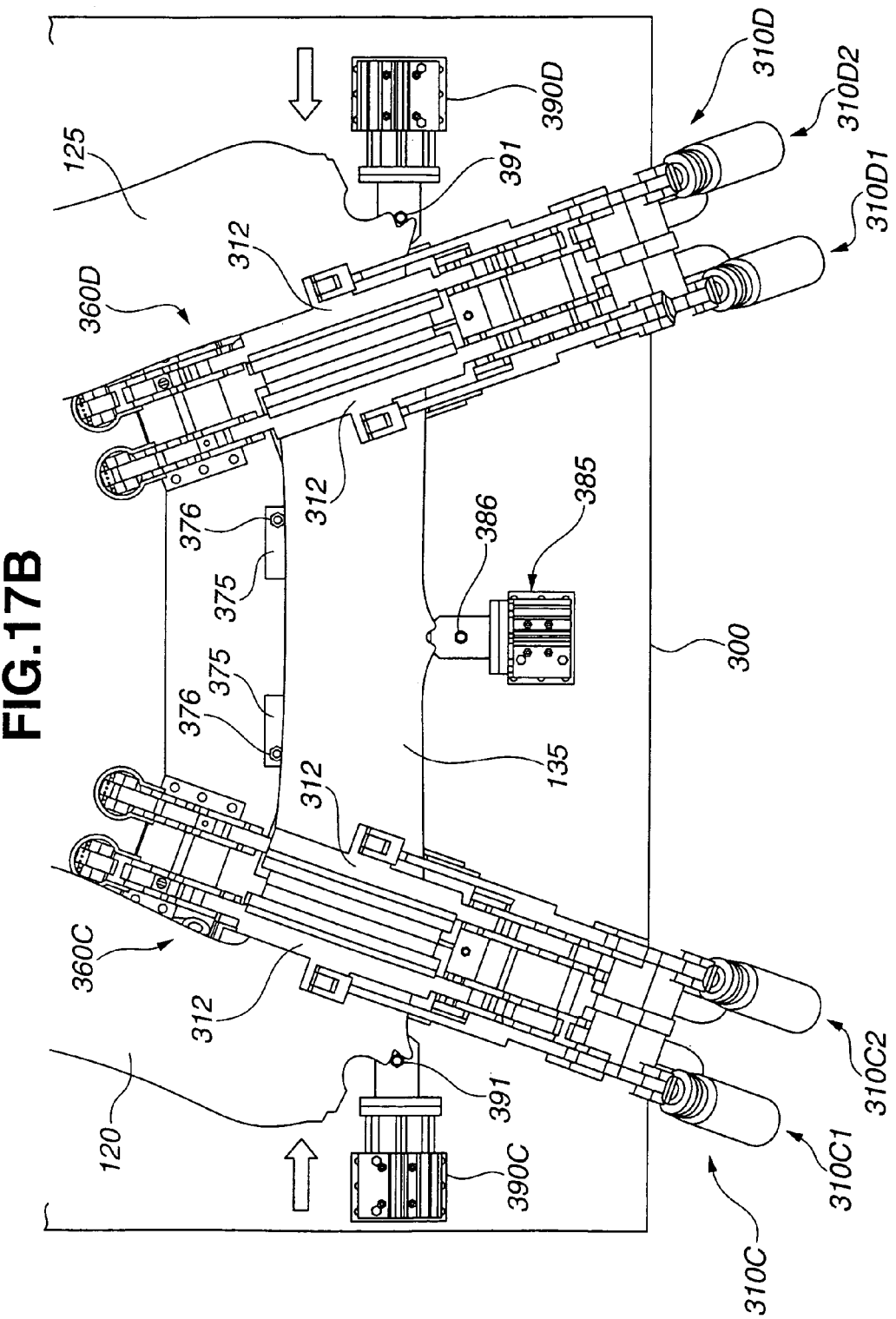
Figure 18:
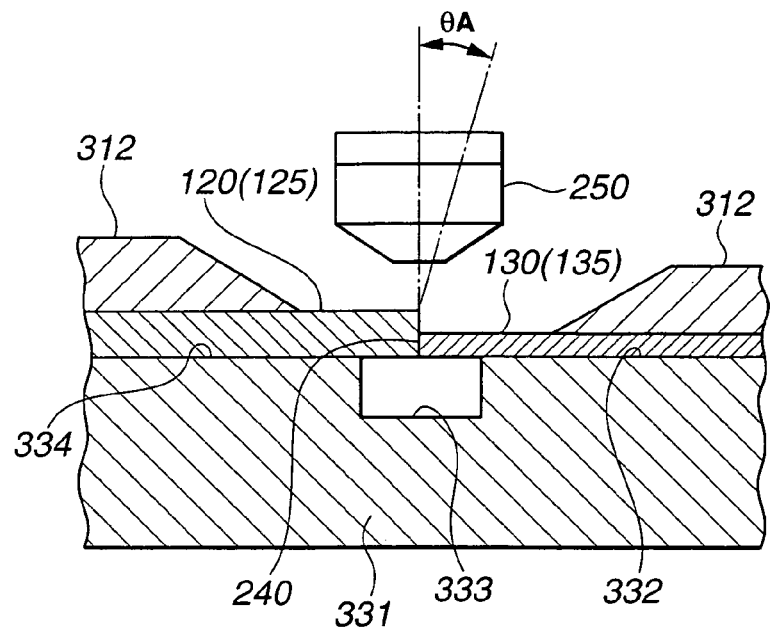
FIG. 18 is a schematically illustrated sectional view of a given part of the clamp device of the invention in a condition wherein a welding is being applied to mutually contacting edges of the thicker and thinner blank pieces.

As will become apparent as the description proceeds, when left and right thicker and upper and lower thinner blank pieces 120, 125, 130 and 135 are properly clamped by the clamp device "CLD", mutually facing edges 240 of every neighboring two of blank pieces 120, 125, 130 and 135 are kept in contact with one another, as will be seen from FIGS. 17A, 17B and 18.

As is seen from FIGS. 13A and 4A, the two positioning units 360A1 and 360A2 are positioned at a left side of clamp unit 310A, which establish a positioning of a left edge of upper thinner blank piece 130 relative to its corresponding mounting table 331 and the other two positioning units 360B1 and 360B2 are positioned at a right side of clamp unit 310B, which establish a positioning of a right edge of upper thinner blank piece 130 relative to its corresponding mounting table 331, as will be described in detail hereinafter.

As is seen from FIGS. 13B and 4B, the positioning unit 360C is positioned at a left side of clamp unit 310C, which establishes a positioning of a left edge of lower thinner blank piece 135 relative to its corresponding mounting table 331 and the other positioning unit 360D is positioned at a right side of clamp unit 310D, which establishes a positioning of a right edge of lower thinner blank piece 135 relative to its corresponding mounting table 331, as will be described in detail hereinafter.

As is understood from FIGS. 13A and 4A, positioning unit 380 is arranged at a middle position between clamp units 310A and 310B, which establishes a positioning of upper thinner blank piece 130 in a vertical direction in the drawings, that is, in the direction of the arrow "CD" of FIG. 4A, as will be described in detail hereinafter.

While, as is seen from FIGS. 13B and 4B, the other positioning unit 385 is arranged at a middle position between clamp units 310C and 310D, which establishes a positioning of lower thinner blank piece 135 in a vertical direction in the drawings, that is, in the direction of the arrow "CD" of FIG. 4B, as will be described in detail hereinafter.

As is seen from FIG. 4A, positioning unit 380 comprises a hydraulic cylinder (no numeral), a positioning pin 381 driven by the hydraulic cylinder, a pin holder 370 and stopper pins 371 fixed to pin holder 370.

As is seen from FIG. 4B, positioning unit 385 comprises a hydraulic cylinder (no numeral), a positioning pin 386 driven by the hydraulic cylinder, a pin holder 375 and stopper pins 376 fixed to pin holder 375.

That is, as will be described in detail hereinafter, upon energization of the hydraulic cylinders, positioning pins 381 and 386 are brought into contact with upper and lower thinner blank pieces 130 and 135 and move the same toward the associated stopper pins 371 and 376. With this, positioning of upper and lower thinner blank pieces 130 and 135 in the direction of the arrow "CD" is established.

As is seen from FIGS. 4A and 4B, the four positioning units 390A, 390B, 390C and 390D are arranged outside of clamp units 310A, 310B, 310C and 310D to establish a positioning of left and right thicker blank pieces 120 and 125 in a lateral direction in the drawings, that is, in the direction of the arrow "SD" of FIGS. 4A and 4B.

The two positioning units 390A and 390C are arranged to handle the left thicker blank piece 120, while the other two positioning units 390B and 390D are arranged to handle the right thicker blank piece 125.

As is seen from the drawings, each positioning unit 390A, 390B, 390CB or 390D comprises a positioning pin 391 that is to be in contact with an outer edge of left or right thicker blank piece 120 or 125 and a hydraulic cylinder (no numeral) that drives or moves positioning pin 391 with a hydraulic power.

That is, upon energization of the hydraulic cylinders, positioning pins 391 of the four positioning units 390A, 390B, 390C and 390D are brought into contact with left and right thicker blank pieces 120 and 125 and move the same inwardly, that is, toward upper and lower thinner blank pieces 130 and 135.

In the following, clamp units 310A, 310B, 310C and 310D will be described in detail with reference to FIGS. 5, 6, 7, 8 and 9.

Figure 5:
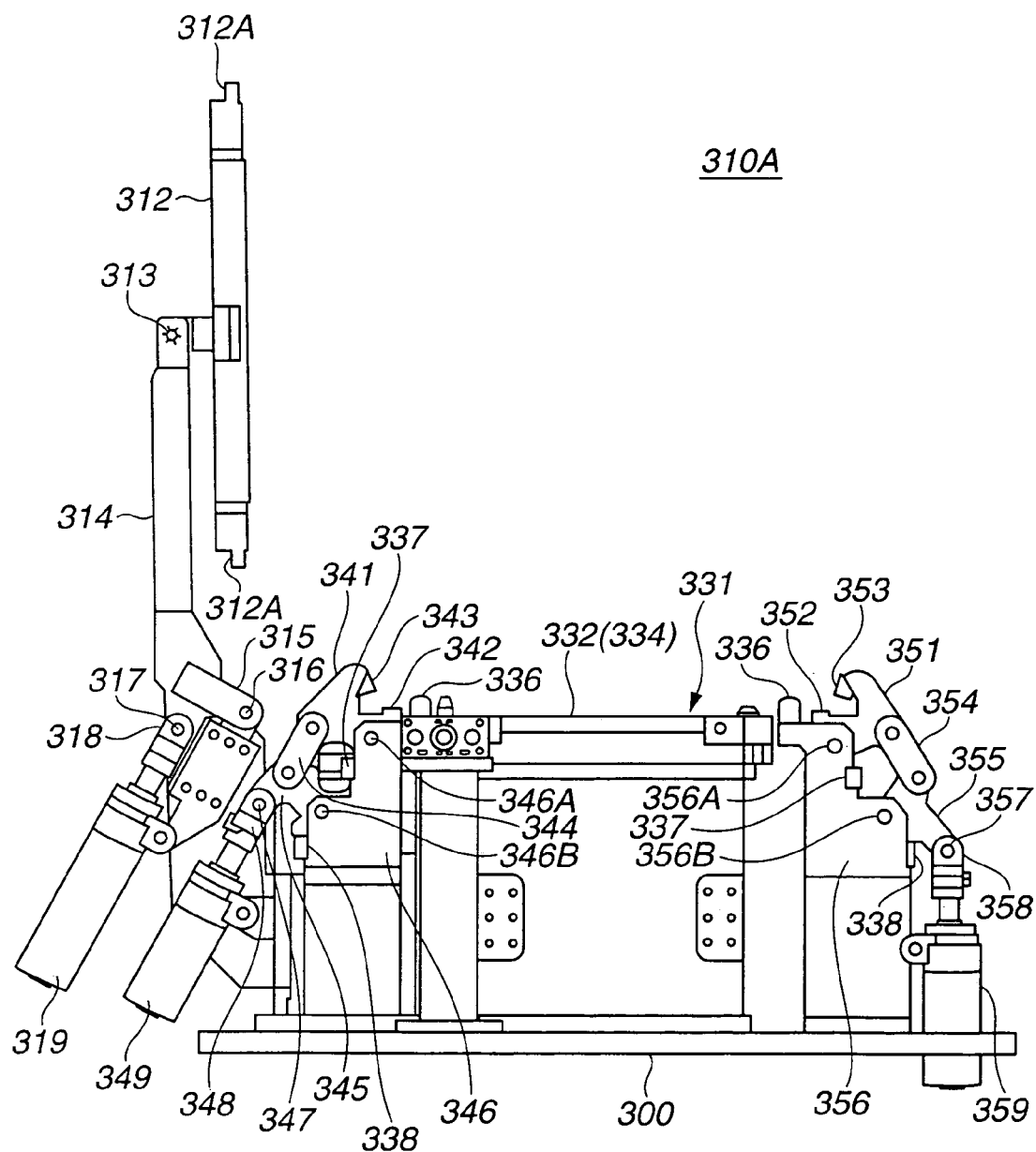
FIG. 5 is a side view of the clamp device of the present invention, that is taken from the direction of the arrow "V" of FIG. 4A.
Figure 8:
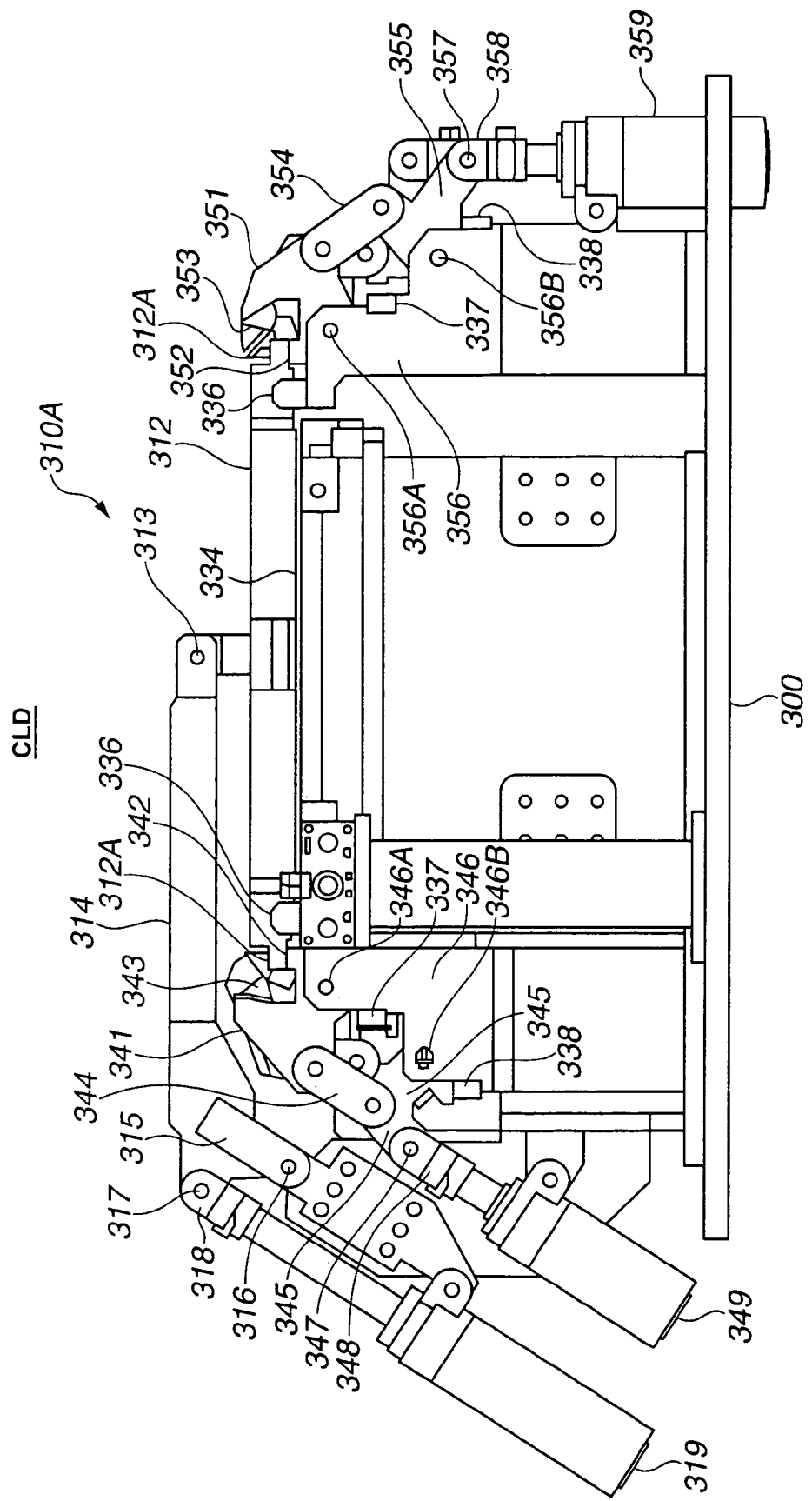
FIG. 8 is a view similar to FIG. 5, but showing a condition wherein the clamp plate is put on the second mounting surface of the mounting table.
Figure 9:
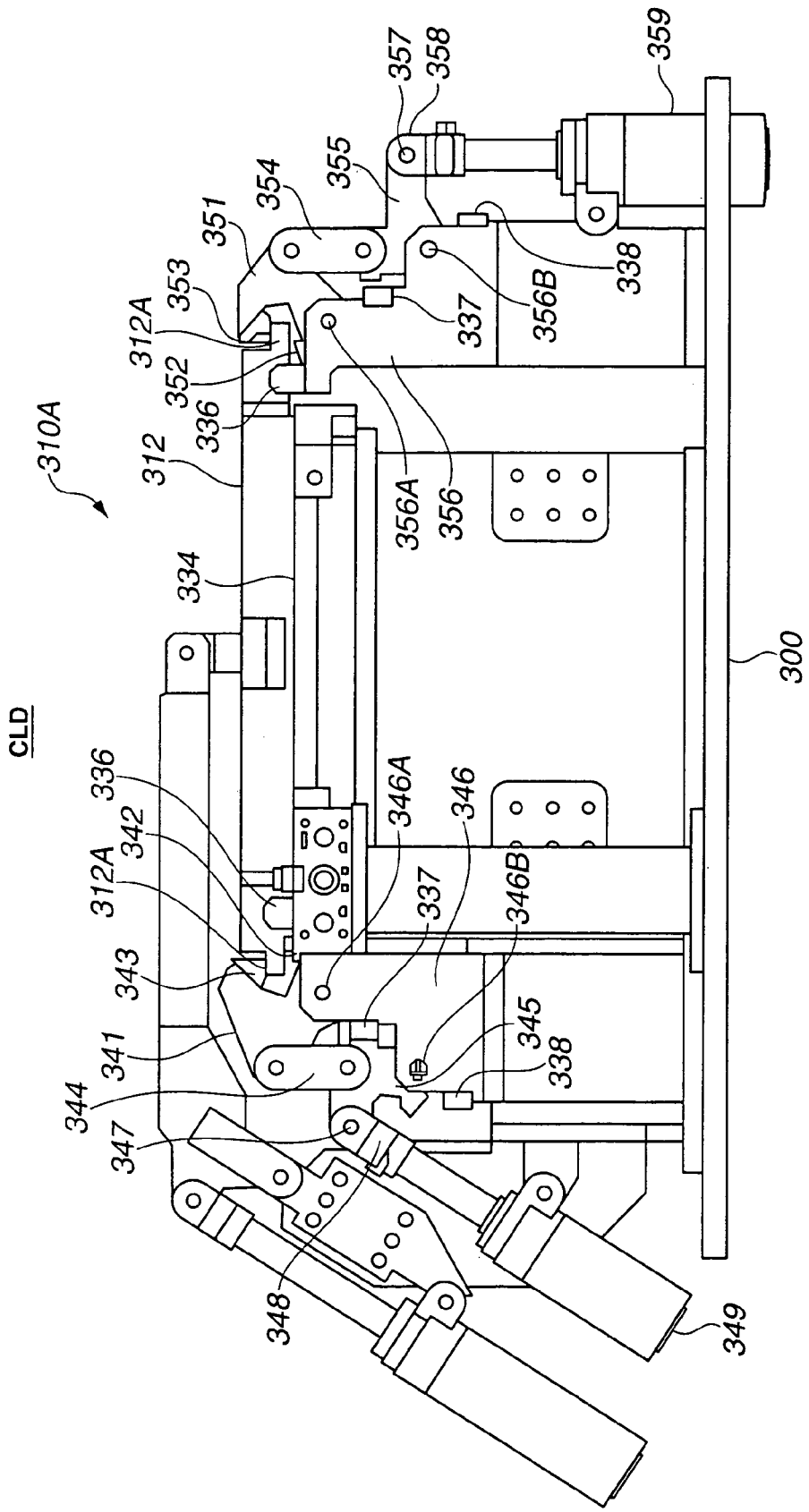
FIG. 9 is a view similar to FIG. 8, but showing a condition wherein the clamp plate on the second mounting surface is kept locked.

FIGS. 5, 8 and 9 show side views of clamp unit 310A. It is to be noted that these side views of clamp unit 310A are taken from the direction of the arrow "V" of FIG. 4A.

As has been mentioned hereinabove, each clamp unit, for example, the clamp unit 310A includes inside and outside identical clamping units 310A1 and 310A2. Inside clamping unit 310A1 is arranged to clamp a left part of upper thinner blank piece 130 and outside clamping unit 310A2 is arranged to clamp an upper part of left thicker blank piece 120.

As is seen from FIGS. 5 and 4A, each clamp unit 310A (310B, 310C or 310D) comprises a mounting table 331 on which first and second mounting surfaces 332 and 334 are formed.

Figure 6:
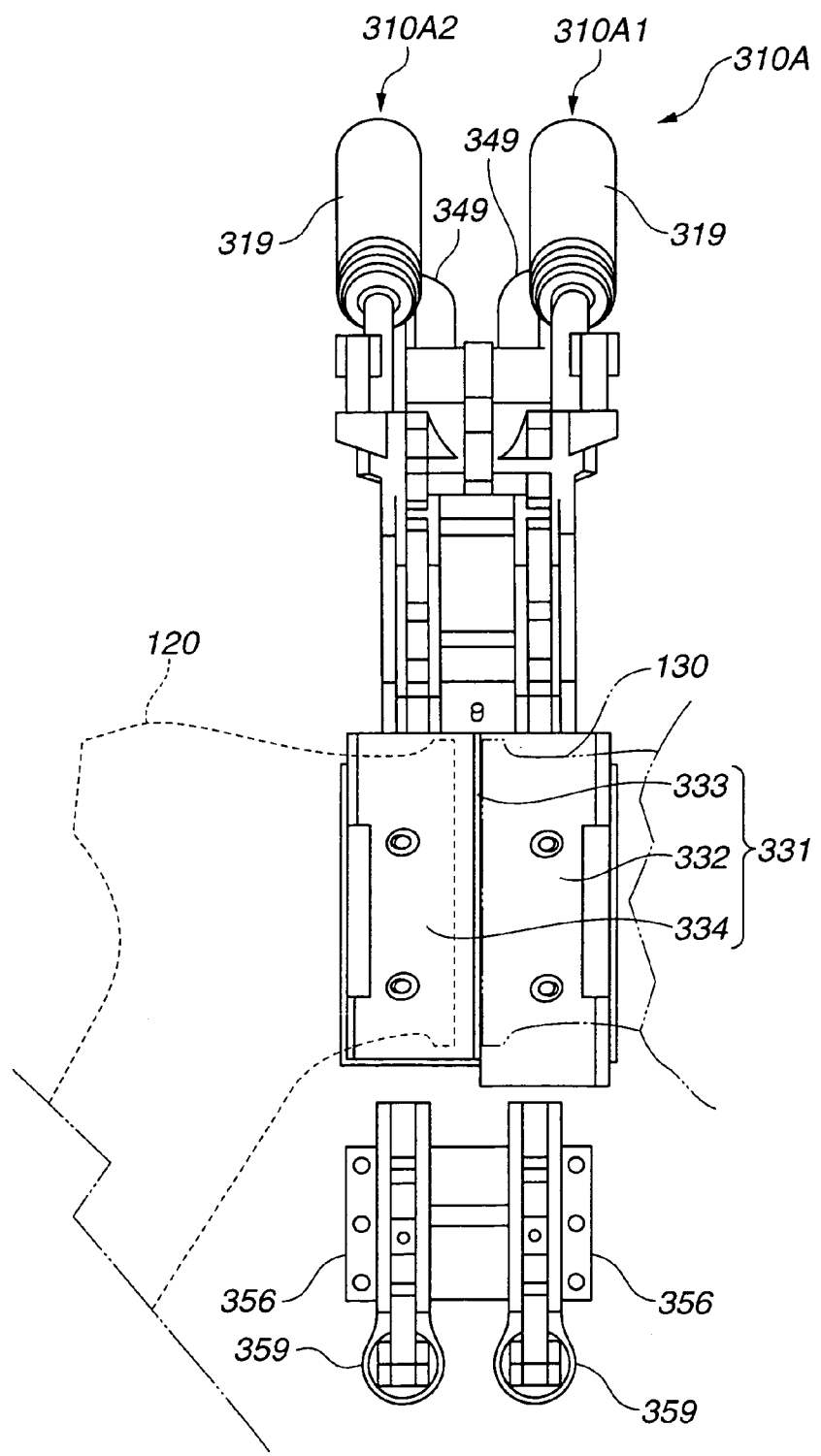
FIG. 6 is a plan view of one of the clamp units employed in the clamp device of the present invention, showing first and second mounting surfaces of a mounting table possessed by the clamp unit.
Figure 7:
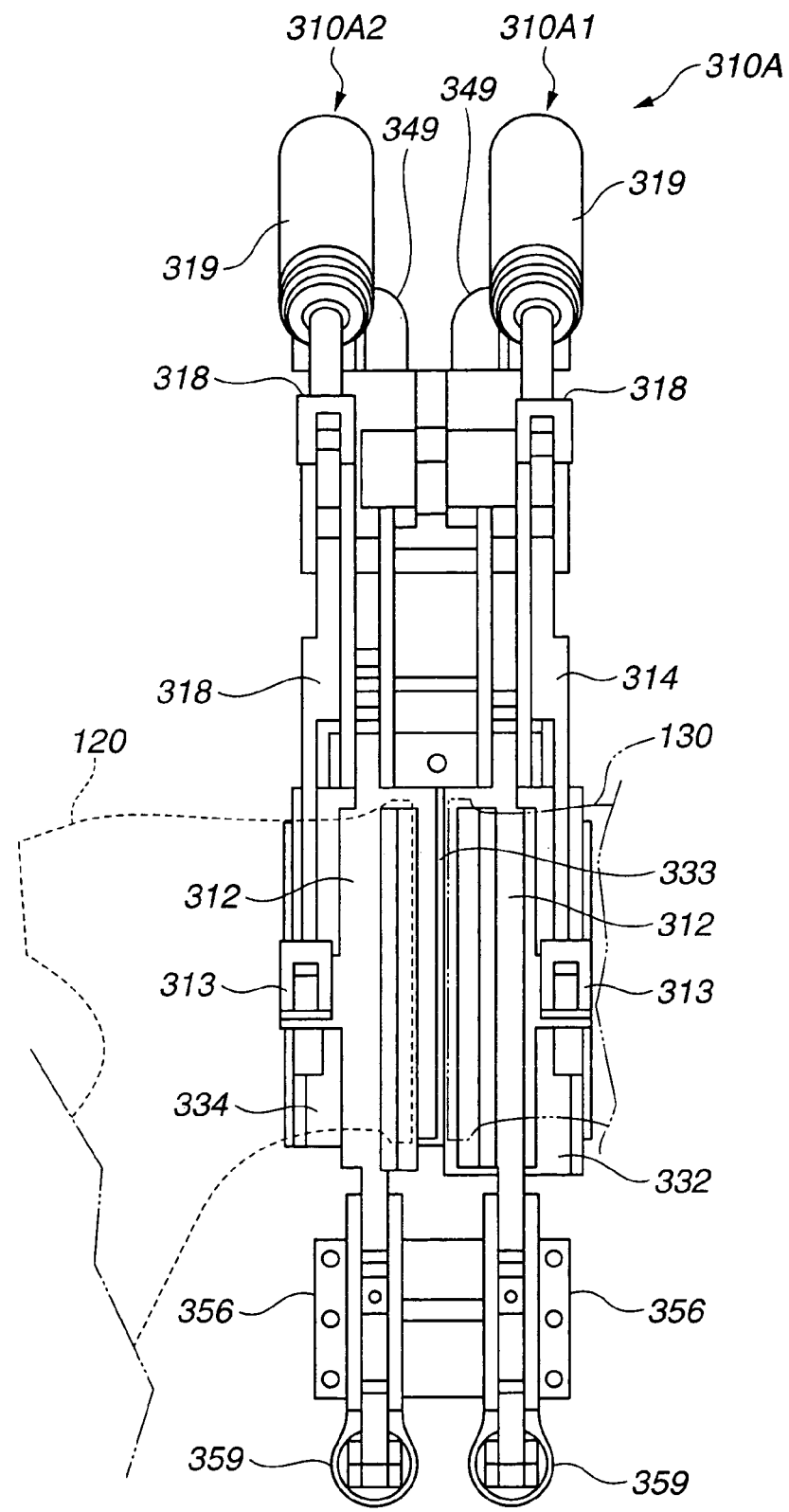
FIG. 7 is a view similar to FIG. 6, but showing two clamp plates that are respectively put on the first and second mounting surfaces of the mounting table.

As is understood from FIGS. 5 and 6, mounting table 331 has first and second mounting surfaces 332 and 334 which are rectangular in shape and constitute a fixed mounting surface. Between first and second mounting surfaces 332 and 334, there is defined a groove 333.

As will be understood from FIG. 6, in case of clamp unit 310A, first mounting surface 332 serves to put thereon a left part of upper thinner blank piece 130 and second mounting surface 334 serves to put thereon an upper part of left thicker blank piece 120.

While, as is understood from FIG. 13A, in case of clamp unit 310B, first mounting surface 332 serves to put thereon a right part of upper thinner blank piece 130 and second mounting surface 334 serves to put thereon an upper part of right thicker blank piece 125. As is seen from 13B, in case of clamp unit 310C, first and second mounting surfaces 332 and 334 serve to put thereon a left part of lower thinner blank piece 135 and a lower part of left thicker blank piece 120 respectively, and in case of clamp unit 310D, first and second mounting surfaces 332 and 334 serve to put thereon a right part of lower thinner blank piece 135 and a lower part of right thicker blank piece 125 respectively.

As is seen from FIG. 4A, beside second mounting surface 334 of clamp unit 310A or 310B, there are arranged the positioning units 360A1 and 360A2 (or 360B1 and 360B2). While, as is seen from FIG. 4B, beside second mounting surface 334 of clamp unit 310C or 310D, there is arranged the positioning unit 360C or 360D. As shown in these drawings, viz., FIGS. 4A and 4B, the size of second mounting surface 334 is smaller than that of first mounting surface 332.

As is best seen from FIG. 6, between first and second rectangular mounting surfaces 332 and 334, there is defined the groove 333 over which mutually facing edges of thicker and thinner blank pieces 120 and 130 (125 and 130, 120 and 135, or 125 and 135) are to be brought into contact with each other for preparation of a subsequent welding process.

As is seen from FIGS. 13A and 4A and as will become apparent as the description proceeds, at an initial stage of operation of the clamp device "CLD", the left and right parts of upper thinner blank piece 130 are put on respective first mounting surfaces 332 of the mounting tables 331 of respective clamp units 310A and 310B, the upper part of left thicker blank piece 120 is put on second mounting surface 334 of the mounting table 331 of clamp unit 310A and the upper part of right thicker blank piece 125 is put on second mounting surface 334 the mounting table 331 of clamp unit 310B, and as is seen from FIGS. 13B and 4B and as will become apparent hereinafter, at the initial stage of operation of the clamp device "CLD", lateral end portions of lower thinner blank piece 135 are put on respective first mounting surfaces 332 of the mounting tables 331 of positioning units 360C and 360D, the lower part of left thicker blank piece 120 is put on second mounting surface 334 of the mounting table 331 of positioning unit 360C and the lower part of right thicker blank piece 125 is put on second mounting surface 334 of the mounting table 331 of positioning unit 360D.

W the positioning of the four blank pieces 120, 125, 130 and 135 is completed, mutually contacting edges of every neighboring two of thicker and thinner blank pieces 120, 125, 130 and 135 are placed over the corresponding grooves 333.

As is seen from FIGS. 5 and 6, each clamping unit 310A1 or 310A2 of each clamp unit 310A (310B, 310C or 310D) comprises generally a clamp plate 312, a hydraulic cylinder 319 and an arm member 314 that operatively connects hydraulic cylinder 319 and arm member 314.

As shown in FIG. 5, a lower portion of arm member 314 has a bracket 315 fixed thereto, and bracket 315 is pivotally connected to a fixed frame portion of clamp unit 310A through a pivot pin 316. A lower end of arm member 314 is pivotally connected to a piston rod 318 of hydraulic cylinder 319 through a pivot pin 317, and an upper end of arm member 314 is pivotally connected to an intermediate portion of clamp plate 312 through a pivot pin 313.

Thus, upon energization of hydraulic cylinder 319, piston rod 318 is pushed upward in FIG. 5 thereby to pivot arm member 314 in a clockwise direction about pivot pin 316. With this, as is seen from FIG. 7, in case of clamping units 310A1 and 310A2 of clamp unit 310A, respective clamp plates 312 are pivoted down onto first and second mounting surfaces 332 and 334 of the mounting table 331. Thus, when the upper part of left thicker blank piece 120 is placed on second mounting surface 334 and the left part of upper thinner blank piece 130 is placed on first mounting surface 332, such parts of the blank pieces 120 and 130 are pressed or clamped by the respective clamp plates 312 respectively. It is to be noted that, as is understood from FIG. 4A, the right part of upper thinner blank piece 130 and the upper part of right thicker blank piece 125 are respectively pressed or clamped by clamp plates 312 of clamp unit 310B, and as is understood from FIG. 4B, the lower part of left thicker blank piece 120 and the left part of lower thinner blank piece 135 are pressed or clamped by respective clamp plates 312 of clamp unit 310C, and as is understood from the same drawing, the lower part of right thicker blank piece 125 and the right part of lower thinner blank piece 135 are pressed or clamped by respective clamp plates 312 of clamp unit 310D.

For assuring the pressing of clamp plates 312 relative to thicker and thinner blank pieces 120, 125, 130 and 135, each clamp plate 312 can be locked by an action of a lock mechanism.

It is to be noted that the lock mechanism is provided for each clamp plate 312. Since the lock mechanisms of the clamp units 310A, 310B, 310C and 310D are substantially same in construction, the following description will be directed to only the lock mechanism for the clamp plate 312 that is to be pivoted onto second mounting surface 334 of clamp unit 310A (see FIG. 4A).

As is seen from FIG. 5, the lock mechanism generally comprises left and right locking pawls 341 and 351, left and right hydraulic cylinders 349 and 359, a first left link 344, a second left link 345, a first right link 354 and a second right link 355. Left locking pawl 341 is pivotally connected to a piston rod 348 of left hydraulic cylinder 349 through first left link 344, second left link 345 and a pivot pin 347 by which second left link 345 and piston rod 348 are pivotally connected. Left locking pawl 341 is pivotally connected to a fixed frame member 346 through a pivot pin 346A, and second left link 345 is pivotally connected through a pivot pin 346B to the fixed frame member 346. Right locking pawl 351 is pivotally connected to a piston rod 358 of right hydraulic cylinder 359 through first right link 354, second right link 355 and a pivot pin 357 through which second right link 355 and piston rod 358 are pivotally connected. Right locking pawl 351 is pivotally connected through a pivot pin 356A to a fixed frame member 356, and second right link 355 is pivotally connected through a pivot pin 356B to the fixed frame member 356.

Each locking pawl 341 or 351 has a generally V-shaped recess of which opposed inner surfaces are formed with opposed first and second projections 342 and 343 (or 352 and 353) respectively.

First projection 342 or 352 has a generally rectangular top surface that is sized and arranged to receive a reduced side edge 312A of clamp plate 312. When, with left thicker part blank piece 120 being put on second mounting surface 334, the corresponding clamp plate 312 is put onto the top surfaces of first projections 342 and 352, there is defined a thin clearance between an upper surface of left thicker blank piece 120 and a lower surface of the clamp plate 312. Accordingly, even under such condition, movement of left thicker blank piece 120 on the second mounting surface 332 is permitted. It is however to be noted that the thickness of the clearance should be smaller than the thickness of upper and lower thinner blank pieces 130 and 135.

Second projection 343 or 353 has a generally triangular cross section and is able to abut on an upper surface of the reduced side edge 312A of clamp plate 312 that is held on first projections 342 and 352. Thus, when left and right locking pawls 341 and 351 are pivoted inside, clamp plate 312 is pressed against the upper part of left thicker blank piece 120 on second mounting surface 334. Although not shown in the drawings, reduced side edge 312A is formed with two positioning recesses into which second projections 343 and 353 are received when left and right locking pawls 341 and 351 are pivoted in the locking direction.

That is, when hydraulic cylinders 349 and 359 are energized, piston rods 348 and 358 are pushed upward. With this, left and right locking pawls 341 and 351 are pivoted clockwise and counterclockwise respectively about respective pivot pins 346A and 356A. With this, as is seen from FIG. 9, reduced side edge 312A of clamp plate 312 can be locked by left and right locking pawls 341 and 351.

Referring back to FIG. 5, the lock mechanism further has, for each locking pawl 341 or 351, a clamp plate guide 336, a forward movement stopper 337 and a rearward movement stopper 338. Clamp plate guide 336 is mounted on the fixed frame member to properly guide the downward movement of clamp plate 312 onto second mounting surface 334. Forward movement stopper 337 is mounted on the fixed frame member at a position to contact an upper portion of second link 345 or 355 thereby to stop an excessive downward pivoting of second link 345 or 355, and rearward movement stopper 338 is mounted on the fixed frame member at a position to contact a lower portion of second link 345 or 355 thereby to set an initial position of second link 345 or 355. By varying the position of rearward movement stopper 338, the clearance that is to be defined between clamp plate 312 and the upper part of left thicker blank piece 120 can be adjusted.

The construction of six positioning units 360A1, 360A2, 360B1, 360B2, 360C and 360D will be much clearly understood from the following description that is directed to positioning unit 360A1 that positions the left part of upper thinner blank piece 130 relative to first mounting surface 332 of positioning unit 360A1. Since the other positioning units 360A2, 360B1, 360B2, 360C and 360D are substantially the same in construction as the unit 360A1, description of such units 360A2, 360B1, 360B2, 360C and 360D will be omitted.

The description on positioning unit 360A1 will be made in the following with reference to FIGS. 10 and 11.

Figure 10:
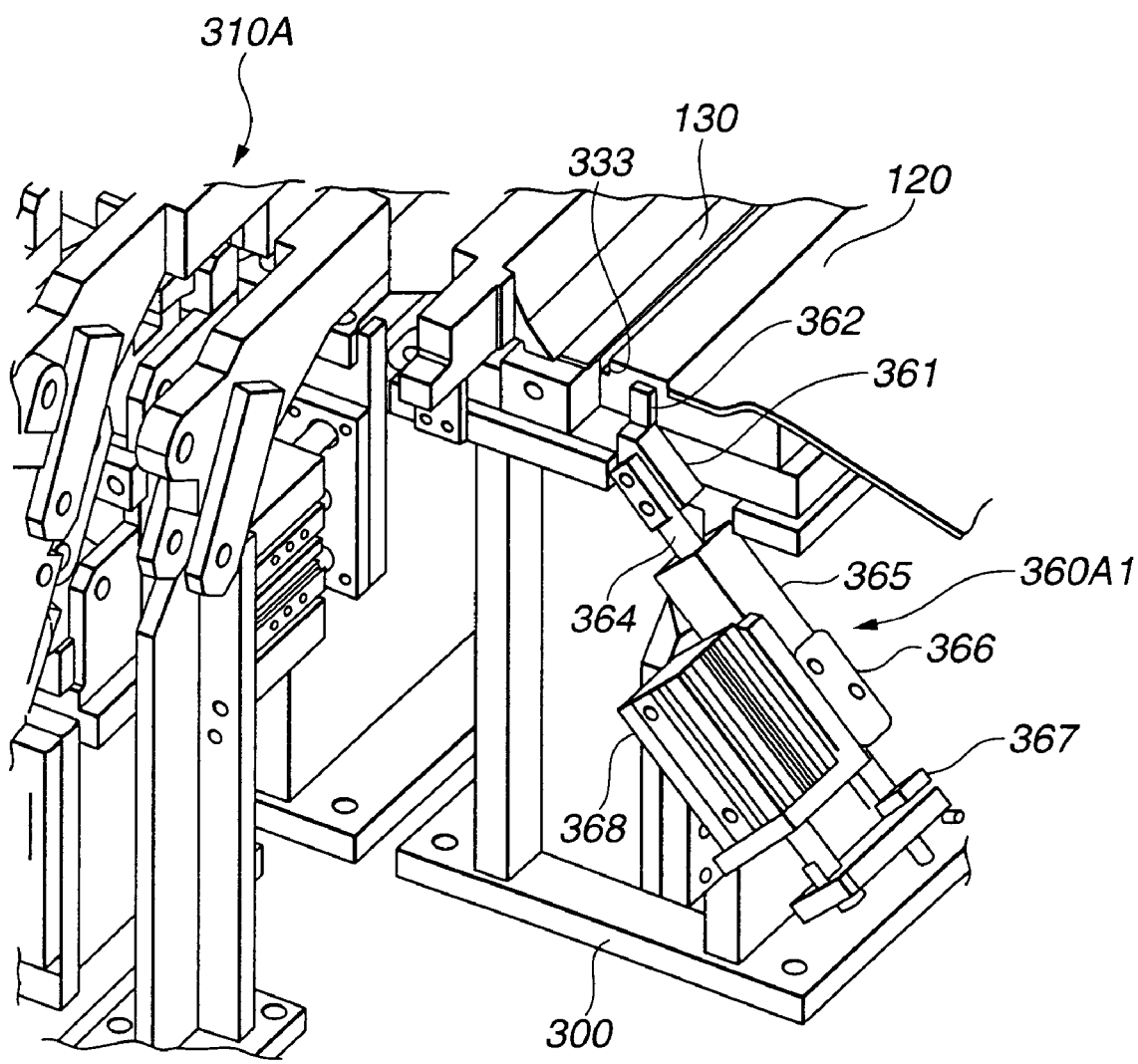
FIG. 10 is a perspective view of a portion of the clamp device of the invention, where one positioning unit is arranged.

As is seen from FIG. 10, positioning unit 360A1 is arranged beside clamp unit 310A and comprises an inclined hydraulic cylinder 368 that is connected to a fixed frame member of clamp device "CLD". Connected to a side wall of hydraulic cylinder 368 is a guide casing 365 that has a sliding rod 364 slidably disposed therein. Although not shown in the drawing, a piston in hydraulic cylinder 368 is connected to sliding rod 364 through a connecting link. With this, movement of the piston in hydraulic cylinder 368 induces movement of sliding rod 364 in the guide casing 365. Sliding rod 364 has at its top a pin holder 361 connected thereto. Pin holder 361 has a positioning pin 362 connected to a top thereof. Denoted by numeral 367 is a position adjuster that can adjust the position of positioning unit 360A1 relative to the tool base 300. Denoted by numeral 366 is a stopper that can suppress an excessive displacement of positioning unit 360A1 by position adjuster 367.

That is, when hydraulic cylinder 368 is energized, sliding rod 364 connected to the piston of the cylinder 368 is slid obliquely upward in guide casing 365 thereby moving positioning pin 362 in the same direction. During this, positioning pin 362 is moved in the same direction, and when sliding rod 364 takes its uppermost position, positioning pin 362 assumes a position where a front edge thereof is placed at a middle position of groove 333 defined between first and second rectangular mounting surfaces 332 and 334. Thus, if the left part of upper thinner blank piece 130 is roughly placed on first mounting surface 332, the upward movement of sliding rod 364 brings about abutment of positioning pin 362 with an edge of the left part of upper thinner blank piece 130 to push the same, and finally places the edge of the left part of upper thinner blank piece 130 at the middle position of groove 333.

As will be understood from FIG. 4A, positioning unit 360A2 that is a partner of the above-mentioned positioning unit 360A1 is arranged at an opposite side of the unit 360A1, which has substantially the same construction as the unit 360A1. Thus, if upper thinner blank piece 130 is roughly placed on first mounting surfaces 332 of clamp units 310A and 310B (see FIG. 4A), synchronous upward movement of two positioning pins 362 of the two units 360A1 and 360A2 finally places the left edge of upper thinner blank piece 130 at the middle position of groove 333.

Figure 12:
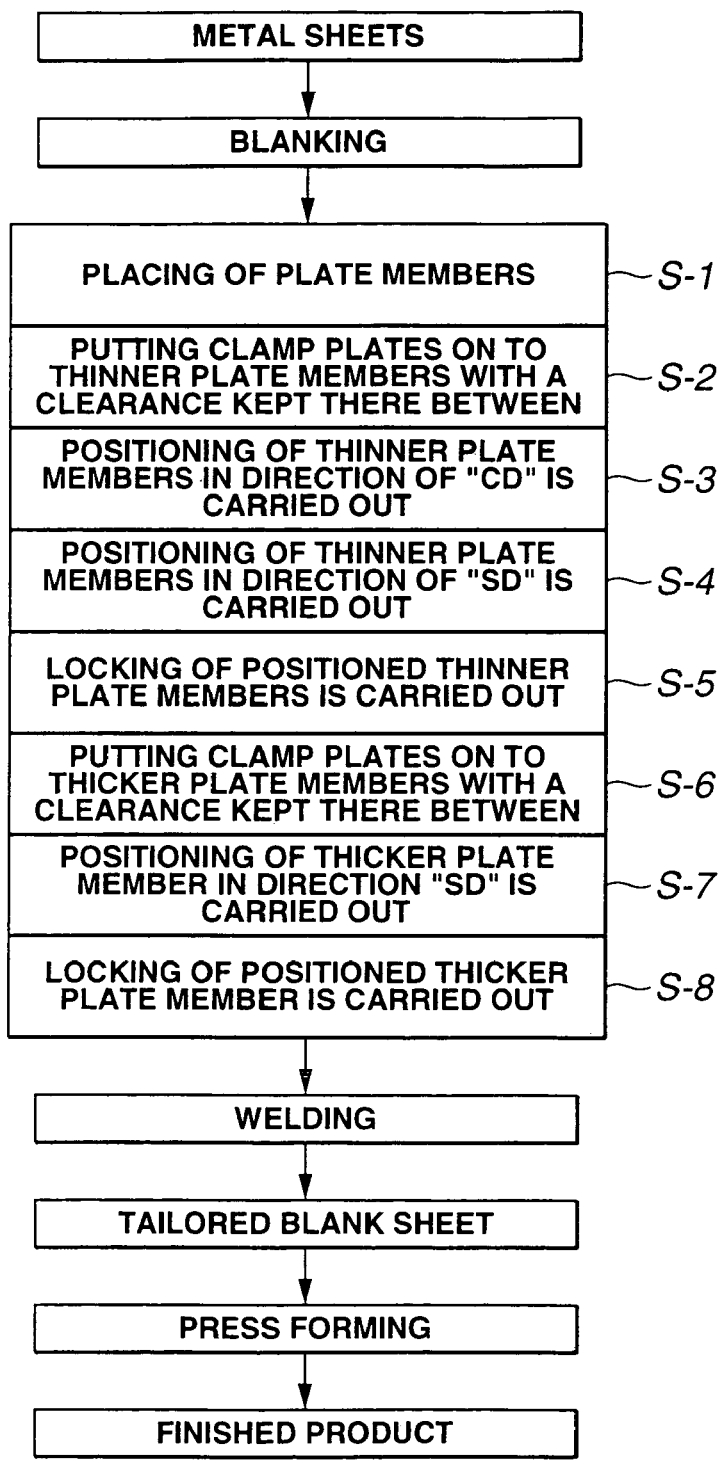
FIG. 12 is a flowchart showing operation steps executed by the clamp device of the present invention.

In the following, operation of the clamp device "CLD" of the present invention will be described with reference to the flowchart of FIG. 12 and other drawings.

As has been mentioned hereinabove, four types of blank pieces 120, 125, 130 and 135 are produced by blanking two metal sheets, as is shown in FIG. 3.

For ease of understanding, the description on operation will be commenced with respect to a stand-by condition of the clamp device "CLD". In this condition, all (viz., eight) of clamp plates 312 are kept opened or raised.

At step S-1, four blank pieces 120, 125, 130 and 135 are put onto the four mounting tables 331 (see FIG. 5) by using, for example, a handling robot (not shown). Upon this, as is understood from FIGS. 13A and 13B, left and right parts of upper thinner blank piece 130 are placed on respective first mounting surfaces 332 of clamp units 310A and 310B, left and right lower thinner blank piece 135 are placed on respective first mounting surfaces 332 of clamp units 310C and 310D, upper and lower parts of left thicker blank piece 120 are placed on respective second mounting surfaces 334 of clamp units 310A and 310C, and upper and lower parts of right thicker blank piece 125 are placed on respective second mounting surfaces 334 of clamp units 310B and 310D. That is, four blank pieces 120, 125, 130 and 135 are laid on first and second mounting surfaces 332 and 334 of the four mounting tables 331 in such a manner as to constitute a trapezoidal shape, as may be easily understood from the drawings.

Figure 14A:
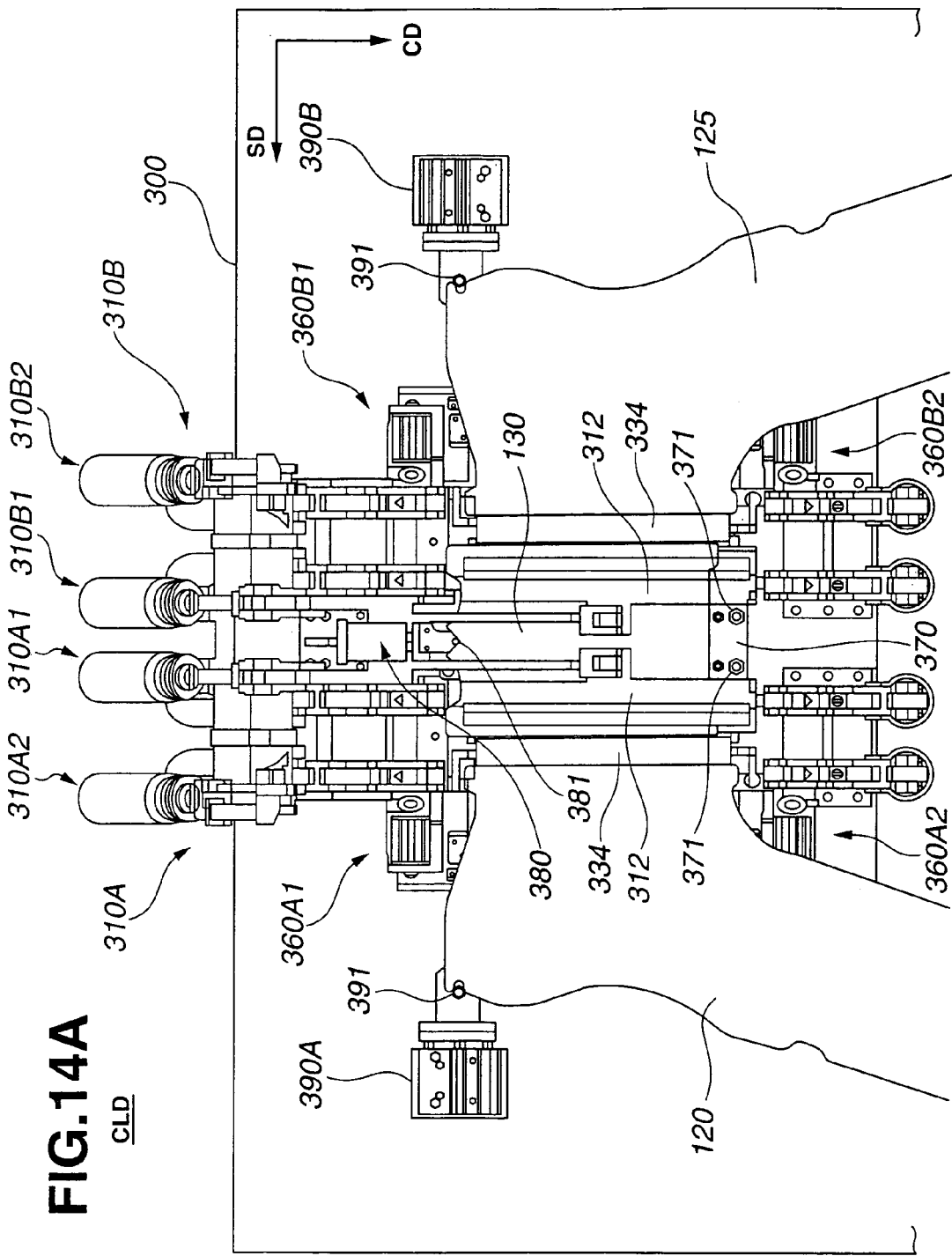

Then, at step S-2, as is seen from FIGS. 14A and 14B, the inside two clamp plates 312 for upper thinner blank piece 130 and the inside two clamp plates 312 for lower thinner blank piece 135 are pivoted down and put on their corresponding blank pieces 130 and 135. Upon this, as has been mentioned hereinabove and as is seen from FIG. 8, projections 342 and 352 of the four pairs of locking pawls 341 and 351 support the reduced side edges 312A of the four clamp plates 312. As is understood from the drawing, there is defined a certain clearance between an upper surface of upper or lower thinner blank piece 130 or 135 and a lower surface of the corresponding clamp plate 312. Due to provision of such clearance, upper thinner blank piece 130 and lower thinner blank piece 135 are permitted to move on their corresponding first mounting surfaces 332 while being guided by the corresponding clamp plates 312.

Figure 15A:
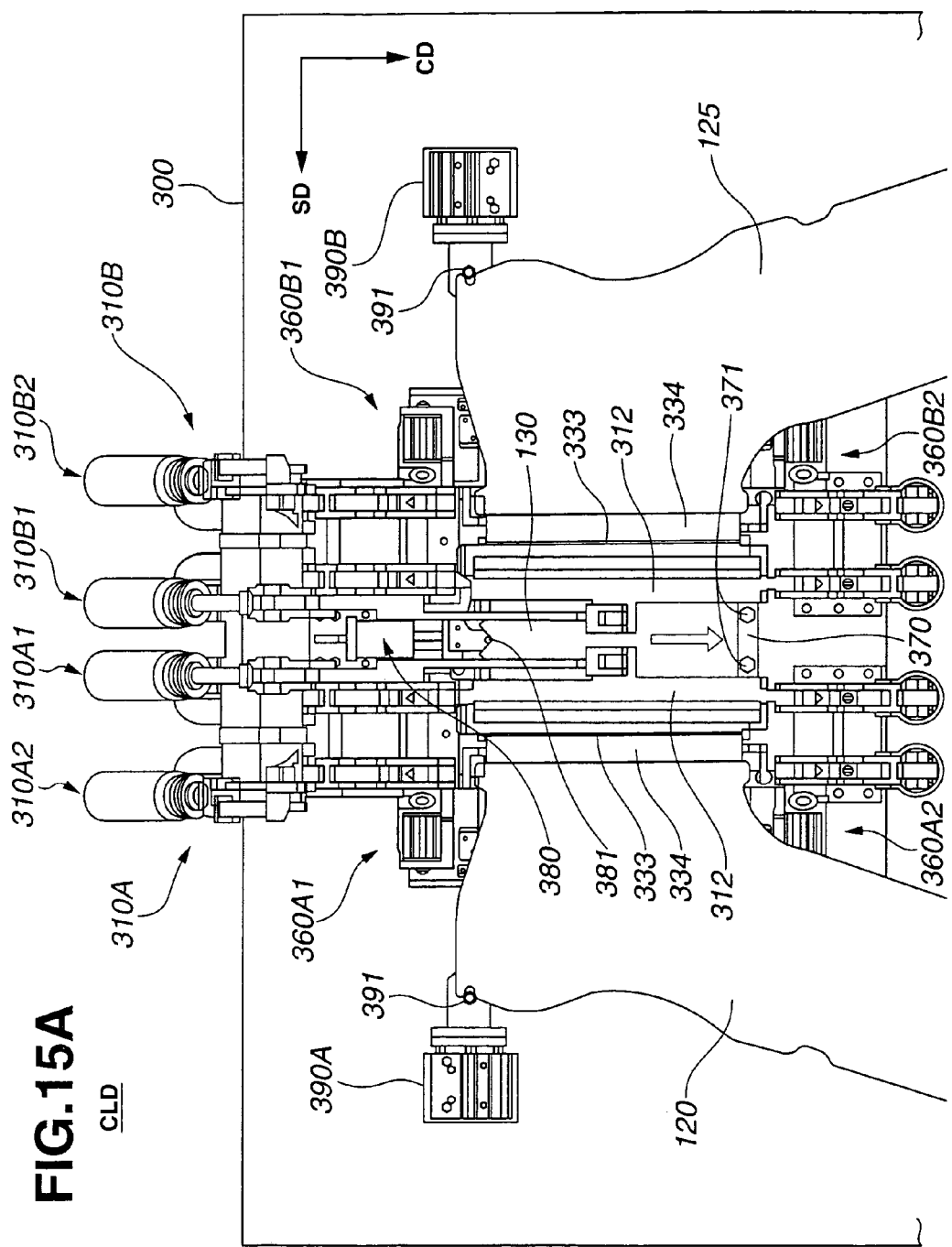

Then, at step S-3, as is seen from FIGS. 15A and 15B, positioning of upper and lower thinner blank pieces 130 and 135 in the direction of the arrow "CD" is carried out. That is, at this step S-3, positioning units 380 and 385 are energized. As shown in the drawings, upon energization of positioning unit 380, positioning pin 381 of the unit 380 is brought into abutment with an upper edge of upper thinner blank piece 130 to push the same toward the stopper pins 371, and upon energization of positioning unit 385, positioning pin 386 of the unit 385 is brought into abutment with a lower edge of lower thinner blank piece 135 to push the same toward the stopper pins 376. With this, positioning of upper and lower thinner blank pieces 130 and 135 in the direction of the arrow "CD" is established.

Then, at step S-4, positioning of upper and lower thinner blank pieces 130 and 135 in the direction of the arrow "SD" is carried out. That is, at this step S-4, six positioning units 360A1, 360A2, 360B1, 360B2, 360C and 360D are energized. Upon energization of the four positioning units 360A1, 360A2, 360B1 and 360B2, upper thinner blank piece 130 is moved but slightly in the above-mentioned manner and finally positioned with respect to the two grooves 333 each being defined between first and second mounting surfaces 332 and 334, as is seen from FIG. 15A, and upon energization of the remaining two positioning units 360C and 360D, lower thinner blank piece 135 is moved but slightly in the above-mentioned manner and finally positioned with respect to the two grooves 333 each being defined between first and second mounting surfaces 332 and 334, as is seen from FIG. 15B. That is, in this case, lateral edges of upper thinner blank piece 130 are each placed at the middle position of the corresponding groove 333, and also lateral edges of lower thinner blank piece 135 are each placed at the middle position of the corresponding groove 333. Positioning of upper and lower thinner blank pieces 130 and 135 is thus accomplished.

Figure 11:
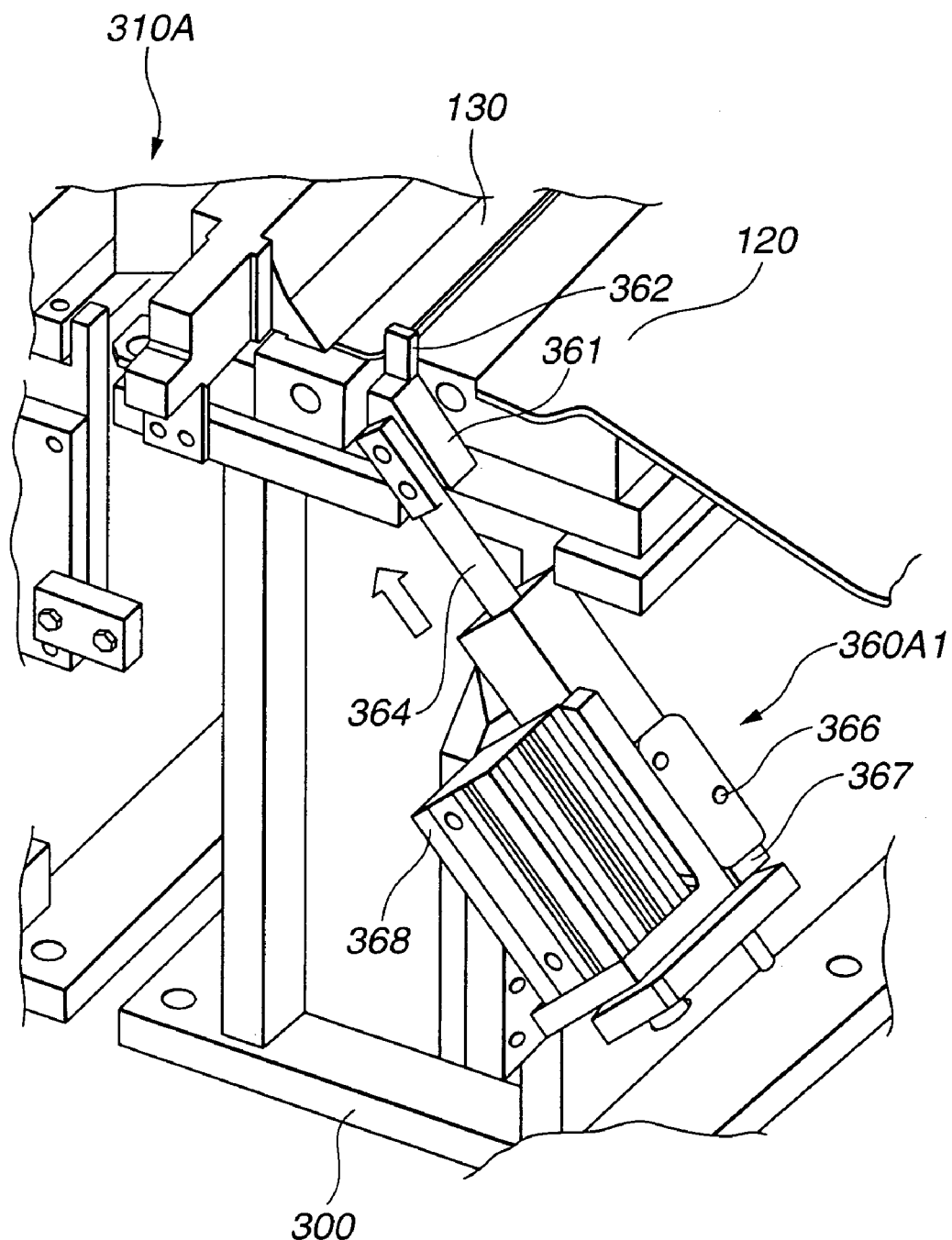
FIG. 11 is a view similar to FIG. 10, but showing a different operation condition of the positioning unit.

This step S-4 will be much clearly understood when taken in conjunction with FIGS. 10 and 11. Actually, movement of upper and lower thinner blank pieces 130 and 135 in the direction of the arrow "SD" is made by positioning pins 362 of positioning units Then, at step S-5, locking of upper and lower thinner blank pieces 130 and 135 is carried out. That is, at this step S-5, as is seen from FIG. 9, the two pairs of locking pawls 341 and 351 for the inside two clamp plates 312 for upper thinner blank piece 130 and the two pairs of locking pawls 341 and 351 for the inside two clamp plates 312 for lower thinner blank piece 135 are pivoted inside by the force of the corresponding hydraulic cylinders 349 and 359. With this, projections 343 and 353 of the locking pawls 341 and 351 for the inside two clamp plates 312 for upper thinner blank piece 130 and those 343 and 353 of the locking pawls 341 and 351 for the inside two clamp plates 312 for lower thinner blank piece 135 are pressed against the reduced side edges 312A of the corresponding clamp plates 312. With this step, upper and lower thinner blank pieces 130 and 135 are locked at their proper positions.

Figure 16B:
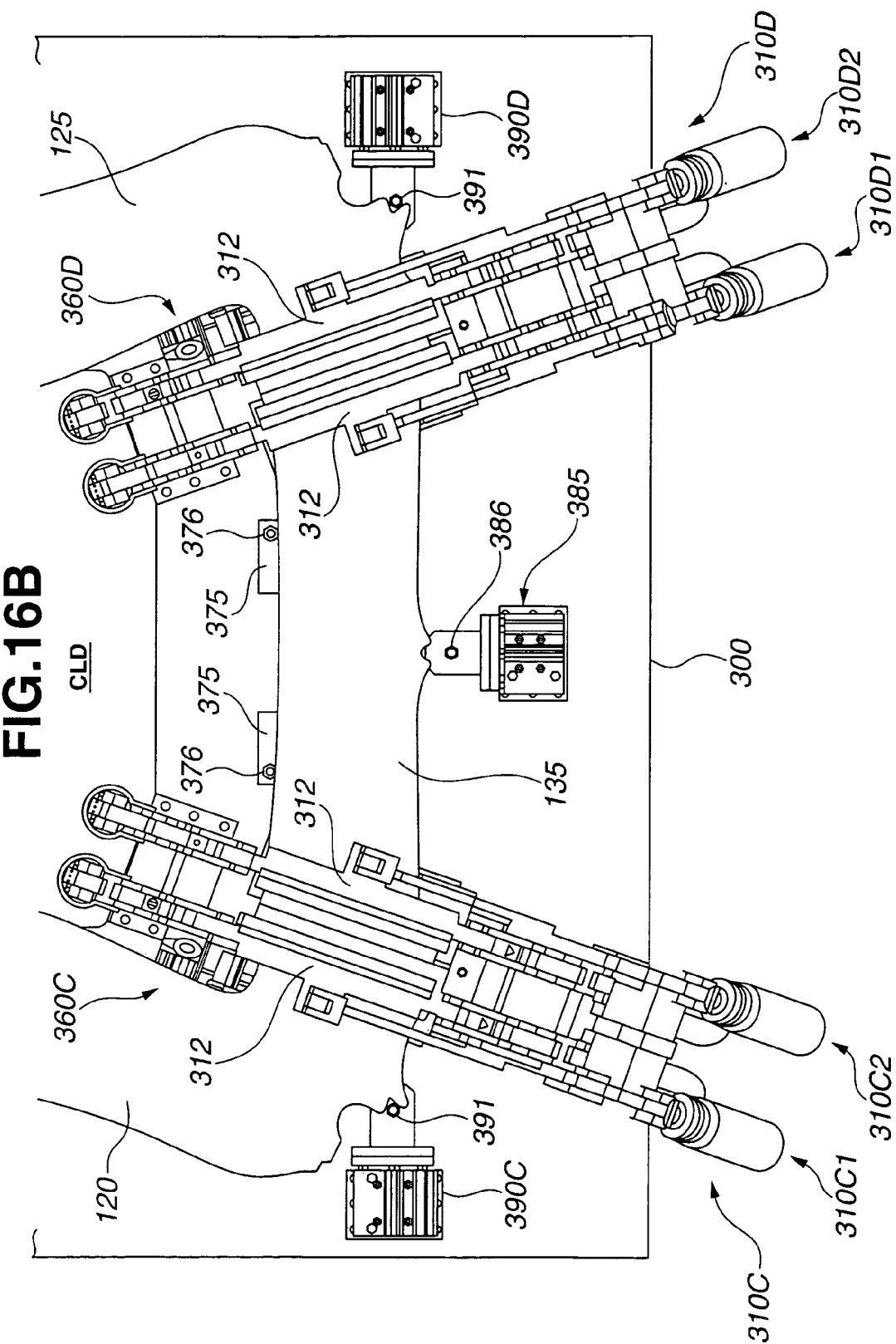

Then, at step S-6, as is seen from FIGS. 16A and 16B, the outside two clamp plates 312 for respective upper parts of left and right thicker blank pieces 120 and 125 and outside two clamp plates 312 for respective lower parts of left and right thicker blank pieces 120 and 125 are pivoted down to be put on their corresponding blank pieces 120 and 125. Upon this, as has been mentioned hereinabove and as is understood from FIG. 8, projections 342 and 352 of the four pairs of locking pawls 341 and 351 support the reduced side edges 312A of the four clamp plates 312. Under this condition, there is defined a certain clearance between an upper surface of each of left and right thicker blank pieces 120 and 125 and a lower surface of the corresponding clamp plate 312. Due to provision of such clearance, left and right thicker blank pieces 120 and 125 are permitted to move on their corresponding second mounting surfaces 334 while being guided by the corresponding clamp plates 312.

Then, at step S-7, as is seen from FIGS. 17A and 17B, positioning of left and right thicker blank pieces 120 and 125 in the direction of the arrow "SD" is carried out. That is, at this step S-7, four positioning units 390A, 390B, 390C and 390D are energized. As shown in the drawings, upon energization of positioning units 390A and 390C, respective positioning pins 391 press left thicker blank piece 120 rightward, and upon energization of positioning units 390B and 390D, respective positioning pins 391 press right thicker blank piece 125 leftward. Due to this operation, each of left and right thicker blank pieces 120 and 125 is brought into contact with both the locked upper and lower thinner blank pieces 130 and 135 at their mutually facing edges. That is, in this condition, positioning of left and right thicker blank pieces 120 and 125 is established.

Then, at step S-8, locking of left and right thicker blank pieces 120 and 125 is carried out. That is, at this step S-8, as is understood from FIG. 9, the two pairs of locking pawls 341 and 351 for the outside two clamp plates 312 for left thicker blank piece 120 and the two pairs locking pawls 341 and 351 for the outside two clamp plates 312 for right thicker blank piece 125 are turned inside by the force of the corresponding hydraulic cylinders 349 and 359. With this, projections 343 and 353 of the locking pawls 341 and 351 for the outside two clamp plates 312 for left thicker blank piece 120 and those 343 and 353 of the locking pawls 341 and 351 for the outside two clamp plates 312 for right thicker blank piece 125 are pressed against the reduced side edges 312A of the corresponding clamp plates 312. With this step, left and right thicker blank pieces 120 and 125 are locked at their proper positions.

Thereafter, four positioning units 390A, 390B, 390C and 390D are deenergized for moving back positioning pins 391 to their rest positions.

With the above-mentioned steps, the four blank pieces 120, 125, 130 and 135 are locked at their proper positions. Under this locked condition, the mutually contacting edges 240 of every neighboring two of thicker and thinner blank pieces 120, 125, 130 and 135 are placed at and above the middle position of the corresponding groove 333 (see FIG. 18).

For producing the tailored blank sheet 110 as shown in FIG. 2, the mutually contacting edges 240 of the four blank pieces 120, 125, 130 and 135 are subjected to a plasma spraying welding for welding thereof. Of course, a laser beam welding, an electron beam welding and the like are also usable for welding such contacting edges 240. With this welding, the four blank pieces 120, 125, 130 and 135 are joined together to constitute the tailored blank sheet 110 of FIG. 2. The tailored blank sheet 110 is then subjected to a press forming to produce a finished product, that is the suspension part 10 of a motor vehicle as shown in FIG. 1.

In the following, the plasma spraying welding will be described with reference to FIGS. 18 and 19.

For carrying out such welding, an arc torch 250 is used from which a plasma arc is jetted. Usually, arc torch 250 comprises a first gas passage through which a plasma gas flows, a second gas passage through which a gas for sealing the welded portion flows and a negative electrode (cathode). The plasma gas is argon, and the sealing gas is a mixture of argon and hydrogen gas.

As is seen from FIG. 18, thinner blank piece 130 (or 135) and thicker blank piece 120 (or 125) are respectively placed on first and second mounting surfaces 332 and 334 with their mutually facing edges 240 kept in contact with each other. Denoted by numeral 333 is the groove of mounting table 331 over which the mutually contacting edges 240 are positioned. Thinner and thicker blank pieces 130 (or 135) and 120 (or 125) are clamped by respective clamp plates 312. In operation, mounting table 331 serves as a positive electrode (anode), and thus, a plasma arc is jetted from arc torch 250 toward the mutually contacting edges 240.

Groove 333 is used for conveying the sealing gas for sealing the welded portion. Furthermore, due to provision of groove 333, a welded bead of the mutually contacting edges 240 is prevented from being welded to first and second mounting surfaces 332 and 334 of mounting table 331.

Figure 19:
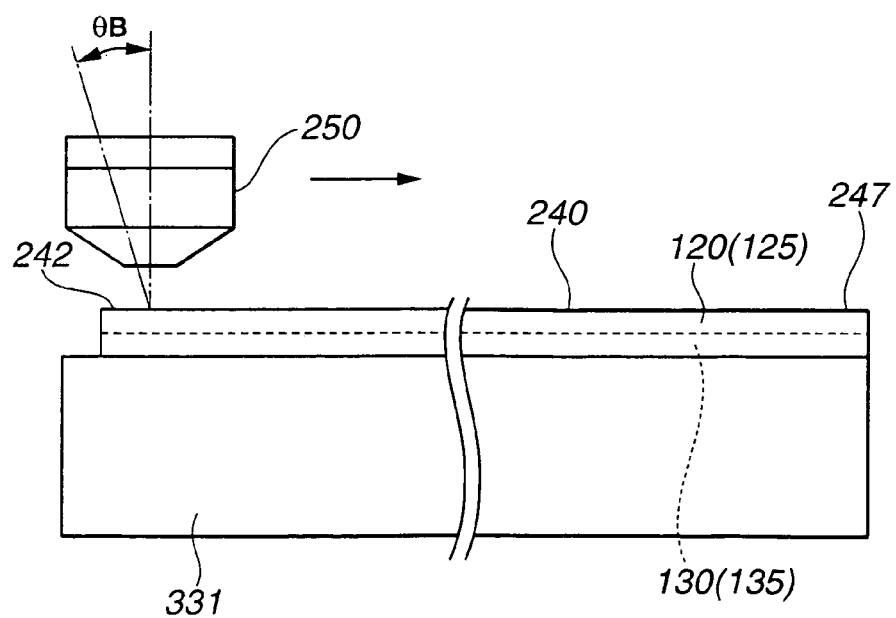
FIG. 19 is an enlarged side view of the given part of the clamp device of the present invention in the condition wherein the welding is being applied to the mutually contacting edges of the thicker and thinner blank pieces.

As is seen from FIG. 19, for carrying out the welding, arc torch 250 is moved along the mutually contacting edges 240 from one end 242 to the other end 247 while jetting the plasma arc to the contacting edges 240. With this, the mutually contacting edges 240 are adequately welded to each other throughout the entire length thereof.

Angles "θA" and "θB" are an angle of inclination and an angle of lead, that are kept taken by arc torch 250 during movement of arm torch 250 along the mutually contacting edges 240 for the welding.

In the following, the blanking of metal sheets for producing thicker and thinner blank pieces 120, 125, 130 and 135 and the shape of the mutually contacting surfaces 240 of thicker and thinner plates members 120, 125, 130 and 135 will be briefly discussed with reference to FIGS. 20, 21A and 21B.

Figure 20:
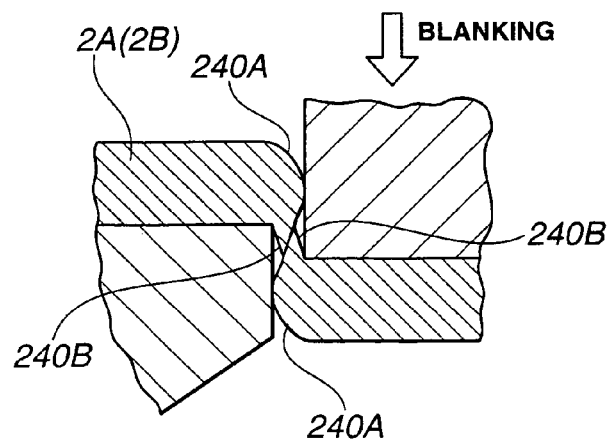
FIG. 20 is a sectional view of a part of the blanking machine showing a condition wherein a metal sheet is subjected to a blanking for producing blank pieces.

As is understood from FIGS. 20 and 3, when metal sheet 2A (or 2B) is subjected to a blanking or stamping, two pieces are produced. The separated two pieces have each a cut edge 240 that includes a shear face 240A that is rounded and a rupture face 240B that is sharply raised.

As is seen from FIG. 2, left and right thicker blank pieces 120 and 125 are symmetrical in shape, and each blank piece 120 or 125 has upper and lower corner portions 121 or 126 that project inward. This means that for effective and speedy preparation of both left and right blank pieces 120 and 125, these two types of blank pieces 120 and 125 are stamped out from metal sheet 2A (or 2B) by using the same cutting die, and when these blank pieces 120 and 125 are brought onto the clamp device "CLD", one of them, for example, the blank piece to become right thicker blank piece 125, is turned upside down.

Figure 21A:
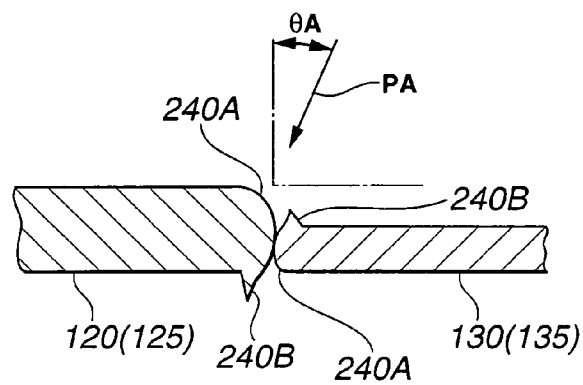
FIG. 21A is a sectional view showing a condition wherein thicker and thinner blank pieces contact at their mutually facing edges.
Figure 21B:
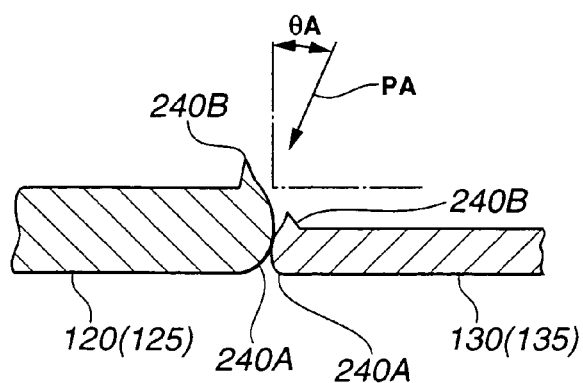
FIG. 21B is a view similar to FIG. 21A, but showing a condition wherein the thicker blank piece is left turned upside down.

Accordingly, as is shown by FIGS. 21A and 21B, two types of arrangement of such thicker blank piece 120 or 125 are inevitably caused relative to thinner blank piece 130 or 135 on the clamp device "CLD".

In case of the arrangement of FIG. 21A, thicker blank piece 120 (or 125) is arranged in such a manner that the shear face 240A thereof is positioned above, while, in case of the arrangement of FIG. 21B, thicker blank piece 125 (or 120) is arranged in such a manner that the shear face 240A is positioned below.

Accordingly, the welding of the mutually contacting edges 240 of thicker and thinner blank pieces 120 and 130 (120 and 135, 125 and 130 or 125 and 135) by the plasma spraying technique should be carried out by taking the above-mentioned two types of arrangement into consideration.

Tests have revealed that, in the arrangement of FIG. 21A, a satisfied result is obtained when the angles "θA" and "θB" (see FIG. 25) are 0 to 10 degrees and 10 to 20 degrees respectively, and in the arrangement of FIG. 21B, a satisfied result is obtained when the angles "θA" and "θB" are 0 to 20 degrees and 10 to 20 degrees respectively.

Tests have further revealed that if mounting table 331 by which first and second mounting surfaces 332 and 334 are defined is increased in size, a sufficient heat radiation is expected by the table 331 under the welding operation. This is important for obtaining a satisfied tailored blank sheet 110 (see FIG. 2).

If desired, a suitable heat controller may be connected to mounting table 331 for controlling the temperature of the table 331 under the welding operation. Of course, by varying an electric power fed to arc torch 250, the welded condition of the mutually contacting edges 240 is suitably controlled.

As has been mentioned hereinafore, the tailored blank sheet 110 thus produced is then subjected to a press forming to produce a product that is for example the suspension part 10 of FIG. 1.

As will be understood from the foregoing description, according to the clamp device "CLD" of the present invention, the following advantageous features are obtained that are not expected in the above-mentioned known clamp devices.

1. In the invention, clamp plates 312 that are pivotal relative to mounting table 331 are arranged beside the table 331 (see FIG. 5). Thus, with clamp plates 312 being kept raised up, the four different blank pieces 120, 125, 130 and 135 can be directly and easily put onto the four pairs of first and second mounting surfaces 332 and 334 of four mounting table 331 from the above.

2. In the invention, positioning of the four blank pieces 120, 125, 130 and 135 is carried out by the twelve positioning units 360A1, 360A2, 360B1, 360B2, 360C, 360D, 380, 385, 390A, 390B, 390C, 390D.

3. In the invention, the properly positioned four blank pieces 120, 125, 130 and 135 can be locked by the lock mechanism that includes left and right locking pawls 341 and 351 for each clamp plate 312.

That is, in the invention, an isolated preset process for previously setting a mutual positioning between the four blank pieces 120, 125, 130 and 135 and an isolated transfer process for transferring the mutually positioned four blank pieces 120, 125, 130 and 135 to their proper positions on mounting tables of a clamp device, which have been inevitably needed in the aforementioned conventional clamp device, are not needed. That is, in the present invention, such processes are systematically and easily carried out by only the clamp device "CLD".

The entire contents of Japanese Patent Application 2004-106783 filed Mar. 31, 2004 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A clamp device for clamping different blank pieces, comprising:
   a mounting table having first and second mounting surfaces for placing thereon first and second ones of the different blank pieces respectively;
   a first clamping unit having a clamp plate that is able to be put on the first blank piece while permitting a guided movement of the first blank piece on the first mounting surface;
   a first positioning unit that moves the first blank piece in a first direction to establish a positioning of the first blank piece in the first direction;
   a second positioning unit that moves the first blank piece in a second direction to establish a positioning of the first blank piece in the second direction;
   a first lock unit that applies a given force to the clamp plate of the first clamping unit for locking the first blank piece that has been positioned in the first and second directions;
   a second clamping unit having a clamp plate that is able to be put on the second blank piece while permitting a guided movement of the second blank piece on the second mounting surface;
   a third positioning unit that moves the second blank piece to a position where a given edge of the second blank piece is in contact with a given edge of the first blank piece that has been locked; and
   a second lock unit that applies a given force to the clamp plate of the second clamping unit for locking the second blank piece that has been positioned by the third positioning unit,
   wherein each of the first and second clamping units comprises:
      a hydraulic cylinder having a piston rod slidably disposed therein; and
      a link mechanism through which the piston rod is connected to the clamp plate of the respective clamping unit, so that energization of the hydraulic cylinder induces a downward pivoting of the clamp plate of the respective clamping unit onto the corresponding blank piece.

2. A clamp device as claimed in claim 1, in which the link mechanism comprises:
   an arm member having one end pivotally connected to a middle portion of the clamp plate of the respective clamping unit and the other end pivotally connected to the piston rod; and
   a bracket secured to the arm member, the bracket being pivotally connected to a fixed frame member.

3. A clamp device for clamping different blank pieces, comprising:
   a mounting table having first and second mounting surfaces for placing thereon first and second ones of the different blank pieces respectively;
   a first clamping unit having a clamp plate that is able to be put on the first blank piece while permitting a guided movement of the first blank piece on the first mounting surface;
   a first positioning unit that moves the first blank piece in a first direction to establish a positioning of the first blank piece in the first direction;
   a second positioning unit that moves the first blank piece in a second direction to establish a positioning of the first blank piece in the second direction;
   a first lock unit that applies a given force to the clamp plate of the first clamping unit for locking the first blank piece that has been positioned in the first and second directions;
   a second clamping unit having a clamp plate that is able to be put on the second blank piece while permitting a guided movement of the second blank piece on the second mounting surface;
   a third positioning unit that moves the second blank piece to a position where a given edge of the second blank piece is in contact with a given edge of the first blank piece that has been locked; and
   a second lock unit that applies a given force to the clamp plate of the second clamping unit for locking the second blank piece that has been positioned by the third positioning unit,
   wherein each of the first, second and third positioning units comprises:
      a hydraulic cylinder; and
      a positioning pin driven by the hydraulic cylinder, the positioning pin being contactable with an edge of one of the first and second blank pieces to move the same.

4. A clamp device as claimed in claim 3, in which the first positioning unit further comprises stopper pins against which an opposite edge of the first blank piece abuts when the first blank piece is moved by the positioning pin.

5. A clamp device as claimed in claim 3, in which the second positioning unit further comprises:
   a guide casing connected to a side of the hydraulic cylinder, the guide casing being inclined relative to the first and second mounting surfaces;
   a sliding rod slidably disposed in the guide casing, the sliding rod having an upper end to which the positioning pin is fixed; and
   a connecting link connecting a piston of the hydraulic cylinder to the sliding rod.

6. A clamp device as claimed in claim 5, in which the second positioning unit further comprises a height adjuster by which an effective length of the sliding rod is adjusted.

7. A clamp device as claimed in claim 5, in which when, due to a force of the hydraulic cylinder, the sliding rod is moved to its uppermost position such that the positioning pin of the second positioning unit comes to a groove that is defined between the first and second mounting surfaces.

8. A clamp device as claimed in claim 3, in which the third positioning unit is arranged to move the second blank piece in a direction that is perpendicular to the first direction in which the first positioning unit moves the first blank piece.

9. A clamp device for clamping different blank pieces, comprising:
   a mounting table having first and second mounting surfaces for placing thereon first and second ones of the different blank pieces respectively;

a first clamping unit having a clamp plate that is able to be put on the first blank piece while permitting a guided movement of the first blank piece on the first mounting surface;

a first positioning unit that moves the first blank piece in a first direction to establish a positioning of the first blank piece in the first direction;

a second positioning unit that moves the first blank piece in a second direction to establish a positioning of the first blank piece in the second direction;

a first lock unit that applies a given force to the clamp plate of the first clamping unit for locking the first blank piece that has been positioned in the first and second directions;

a second clamping unit having a clamp plate that is able to be put on the second blank piece while permitting a guided movement of the second blank piece on the second mounting surface;

a third positioning unit that moves the second blank piece to a position where a given edge of the second blank piece is in contact with a given edge of the first blank piece that has been locked; and a second lock unit that applies a given force to the clamp plate of the second clamping unit for locking the second blank piece that has been positioned by the third positioning unit, wherein each of the first and second lock units comprises:
 two hydraulic cylinders; and
 two locking pawls respectively driven by the two hydraulic cylinders through respective link mechanisms, wherein when the hydraulic cylinders are energized, the two locking pawls are turned in a direction to apply the given force of the respective lock unit to the corresponding clamp plate such that the corresponding blank piece is locked.

10. A clamp device as claimed in claim 9, in which each of the two locking pawls of each of the first and second lock units comprises:

a generally V-shaped recess; and first and second projections formed at opposed portions of the V-shaped recess, wherein when the clamp plate of the respective clamping unit is put on the corresponding blank piece, the first projection supports thereon a peripheral edge of the clamp plate of the respective clamping unit, and wherein when the locking pawls are turned in the direction to apply the given force to the clamp plate of the respective clamping unit, the second projection of each of the two locking pawls presses the peripheral edge of the clamp plate of the respective clamping unit downward.

* * * * *